(12) United States Patent
Raney

(10) Patent No.: US 10,050,847 B2
(45) Date of Patent: Aug. 14, 2018

(54) SELECTIVE SCANNING OF NETWORK PACKET TRAFFIC USING CLOUD-BASED VIRTUAL MACHINE TOOL PLATFORMS

(71) Applicant: Keysight Technologies Singapore (Holdings) Pte Ltd, Minneapolis, MN (US)

(72) Inventor: Kristopher Raney, Austin, TX (US)

(73) Assignee: Keysight Technologies Singapore (Holdings) Pte Ltd, Singapore (SG)

( * ) Notice: Subject to any disclaimer, the term of this patent is extended or adjusted under 35 U.S.C. 154(b) by 187 days.

(21) Appl. No.: 14/501,717

(22) Filed: Sep. 30, 2014

(65) Prior Publication Data
US 2016/0094418 A1    Mar. 31, 2016

(51) Int. Cl.
*H04L 12/26* (2006.01)
*H04L 29/06* (2006.01)

(52) U.S. Cl.
CPC ........ *H04L 43/028* (2013.01); *H04L 12/2615* (2013.01); *H04L 12/2686* (2013.01); *H04L 43/04* (2013.01); *H04L 43/12* (2013.01); *H04L 43/50* (2013.01); *H04L 63/1408* (2013.01); *H04L 12/2607* (2013.01); *H04L 12/2621* (2013.01); *H04L 12/2626* (2013.01); *H04L 12/2694* (2013.01); *H04L 63/20* (2013.01)

(58) Field of Classification Search
CPC ...... H04W 24/08; H04W 24/10; H04L 43/04; H04L 43/28; H04L 43/02; H04L 43/028; H04L 43/12; H04L 43/50; H04L 12/2615; H04L 12/2686; H04L 12/2607; H04L 12/2621; H04L 12/2626; H04L 12/2694; H04L 63/1408; H04L 63/20
See application file for complete search history.

(56) References Cited

U.S. PATENT DOCUMENTS

| 5,515,376 A | 5/1996 | Murthy et al. |
|---|---|---|
| 6,321,259 B1 | 11/2001 | Oullette et al. |
| (Continued) | | |

OTHER PUBLICATIONS

International Search Report and Written Opinion; PCT/US2015/051312, dated Nov. 17, 2015, 11 pgs.

(Continued)

*Primary Examiner* — Asad Nawaz
*Assistant Examiner* — Thomas R Cairns

(57) ABSTRACT

Network tool optimizer devices and related methods are disclosed that provide selective scanning of network packet traffic using cloud-based virtual machine tool platforms. Rather than require local network analysis tool resources, the disclosed embodiments identify subsets of packet traffic of interest, and these subsets are forwarded to a cloud-based server system where cloud-based virtual machine tool platforms are used to process the subsets of traffic of interest. Results from this processing are then provided back to adjust the operation of the network tool optimizers. Some further embodiments use local capture buffers and remote cloud replay buffers to stored subsets of traffic locally for later communication to cloud server systems where cloud-based tools analyze replays of the captured network traffic. Some further embodiments also use results from cloud-based tools to initiate local virtual machine tool platforms that are used to further analyze traffic of interest.

22 Claims, 11 Drawing Sheets

(56) References Cited

U.S. PATENT DOCUMENTS

| | | |
|---|---|---|
| 6,578,147 B1 | 6/2003 | Shanklin et al. |
| 6,785,286 B1 | 8/2004 | O'Keeffe et al. |
| 6,839,349 B2 | 1/2005 | Ambe et al. |
| 6,853,623 B2 | 2/2005 | Nederveen et al. |
| 6,901,517 B1 | 5/2005 | Redmore |
| 6,920,112 B1 | 7/2005 | McCloghrie et al. |
| 6,954,775 B1 | 10/2005 | Shanklin et al. |
| 6,996,779 B2 | 2/2006 | Meandzija et al. |
| 7,016,980 B1 | 3/2006 | Mayer et al. |
| 7,027,437 B1 | 4/2006 | Merchant et al. |
| 7,142,518 B2 | 11/2006 | Mitchell |
| 7,143,196 B2 | 11/2006 | Rimmer et al. |
| 7,254,114 B1 | 4/2007 | Turner et al. |
| 7,245,620 B2 | 7/2007 | Shankar |
| 7,310,306 B1 | 12/2007 | Cheriton |
| 7,424,018 B2 | 9/2008 | Gallatin et al. |
| 7,554,984 B2 | 6/2009 | Kalkunte et al. |
| 7,688,727 B1 | 3/2010 | Ferguson et al. |
| 7,769,873 B1 | 8/2010 | Mackie |
| 7,889,711 B1 | 2/2011 | Minei et al. |
| 7,917,647 B2 | 3/2011 | Cooper et al. |
| 8,005,012 B1* | 8/2011 | Aybay .................... H04L 43/02 370/232 |
| 8,018,943 B1 | 9/2011 | Pleshek et al. |
| 8,098,677 B1 | 1/2012 | Pleshek et al. |
| 8,200,203 B1 | 6/2012 | Christensen et al. |
| 8,447,718 B2 | 5/2013 | Norton et al. |
| 9,356,942 B1* | 5/2016 | Joffe ................... H04L 63/1408 |
| 2001/0022786 A1 | 9/2001 | King et al. |
| 2001/0055274 A1 | 12/2001 | Hegge et al. |
| 2002/0186259 A1 | 12/2002 | Meandzija et al. |
| 2003/0046657 A1 | 3/2003 | White |
| 2003/0074421 A1 | 4/2003 | Kusano et al. |
| 2004/0003094 A1 | 1/2004 | See |
| 2004/0042470 A1 | 3/2004 | Cooper et al. |
| 2004/0103321 A1 | 5/2004 | Wesinger, Jr. et al. |
| 2004/0107361 A1 | 6/2004 | Redan et al. |
| 2004/0196841 A1 | 10/2004 | Tüdor et al. |
| 2005/0053073 A1 | 3/2005 | Kloth et al. |
| 2005/0182950 A1 | 8/2005 | Son et al. |
| 2006/0256788 A1 | 11/2006 | Donahue |
| 2008/0008202 A1 | 1/2008 | Terrell et al. |
| 2008/0072292 A1 | 3/2008 | Narjala |
| 2008/0222731 A1 | 9/2008 | Dowd et al. |
| 2009/0007021 A1 | 1/2009 | Hayton |
| 2009/0013052 A1 | 1/2009 | Robarts et al. |
| 2009/0150996 A1 | 6/2009 | Haswell |
| 2009/0172148 A1 | 7/2009 | Underwood |
| 2009/0327903 A1 | 12/2009 | Smith et al. |
| 2010/0027554 A1 | 2/2010 | Kuthan et al. |
| 2010/0332618 A1 | 12/2010 | Norton et al. |
| 2011/0317694 A1 | 12/2011 | Pleshek et al. |
| 2012/0079107 A1 | 3/2012 | Williams et al. |
| 2012/0106354 A1 | 5/2012 | Pleshek et al. |
| 2012/0317276 A1 | 12/2012 | Muniraju |
| 2013/0215748 A1* | 8/2013 | Ratakonda ............... H04L 43/12 370/235 |
| 2014/0334293 A1* | 11/2014 | Narasimha ............ H04W 28/08 370/229 |
| 2015/0149613 A1* | 5/2015 | Kakadia ................ H04L 47/823 709/224 |
| 2015/0195182 A1 | 7/2015 | Mathur et al. |

OTHER PUBLICATIONS

S. Edwards, "Vulnerabilities of Network Intrusion Detection Systems: Realizing and Overcoming the Risks; The Case for Flow Mirroring," Top Layer Networks, Inc., May 1, 2002.

A. Esson and J. Mannos, "Broadcom BCM5600 StrataSwitch; A Highly Integrated Ethernet Switch on a Chip," Broadcom Corporation, Hot Chips Aug. 17, 1999.

J. Magee, "The Case for IDS Balancing vs. a Switch," Top Layer Networks, Inc., May 2003.

G. Marshall, SC Magazine Reprint, "Attack Mitigator," Aug. 2002.

F. Muhtar, "Appliances to Boost Network Defence," CyberSecurity Malaysia, Nov. 26, 2001.

National Information Assurance Partnership, "Common Criteria Evaluation and Validation Scheme, Validation Report; Top Layer Networks; IDS BalancerTM Version 2.2 Appliance (IDSB3531-CCV1.0, IDSB3532-CCV1.0, IDSB4508-CCV1.0)," Report No. CCEVS-VR-04-0074, National Institute of Standards and Technology; National Security Agency, Sep. 3, 2004.

Radware, "Radware's Smart IDS Management; FireProof and Intrusion Detection Systems; Deployment and ROI," North America Radware, Inc.; International Radware, Ltd., Aug. 21, 2002.

SC Magazine Reprint, "IDS Balancer 3500 Appliance," Jul. 2002.

Top Layer Networks, Inc., "Top Layer Advances Scaleable Intrusion Detection With Industry Leading Multi-Gigabit Offering," Press Release, Mar. 10, 2003.

Top Layer Networks, Inc., "Product Enhancements Optimize Existing Network Intrusion Detection and Prevention Environments," Press Release, Aug. 18, 2003.

Top Layer Networks, Inc., "Case Study—IDS Balancer; Building an Intelligent Monitoring Layer Using the Top Layer IDS Balancer Ensures Full Security Coverage for University of California, Irvine," www.TopLayer.com; 2003.

Top Layer Networks, Inc., "IDS Balancer 3.0 Delivers Ultimate Flexibility in Selecting, Filtering and Distributing Network Traffic," Press Release, Oct. 20, 2004.

Top Layer Networks, Inc., "IDS Balancer; Aggregation, Filtering, & Load Appliance," internet advertisement, www.TopLayer.com., 2004.

Top Layer Networks, Inc., "APP Switch 2500; The Original Top Layer Device to Perfect the Art of Network Security," internet advertisement, www.TopLayer.com.

G. Hilton, et al., "Filtering Path View Graphical User Interfaces and Related Methods," U.S. Appl. No. 12/462,222, filed Jul. 31, 2009.

Ixia, "A Paradigm Shift for Network Visibility: Delivering Better Data for Better Decisions", Rev. A. May 2014, 14 pgs.

Ixia, "Ixia Application and Threat Intelligence Processor", Data Sheet, May 2014, 3 pgs.

\* cited by examiner

SELECTIVE SCANNING OF NETWORK PACKET TRAFFIC USING CLOUD-BASED VIRTUAL MACHINE TOOL PLATFORMS

TECHNICAL FIELD OF THE INVENTION

This invention relates to managing network packets and analyzing network packet streams using network packet analysis tools.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network packet analysis tools. Packets are often forwarded using network hubs, test access ports (TAPs), and/or switched port analyzer (SPAN) ports available on network switches. For example, certain network switches produced by Cisco Systems include SPAN ports to which traffic on the switches are mirrored. It is also noted that other packet monitoring or access methods may also be used to acquire copies of network packets being communicated within a network packet communication infrastructure.

To help alleviate the problem of limited access to network packets for monitoring, tool aggregation devices have been developed that allow shared access to the monitored network packets. These tool aggregation devices allow users to obtain packets from one or more network monitoring points (e.g., network hub, TAP, SPAN port, etc.) and to forward them to different monitoring tools. U.S. Pat. No. 8,018,943 and U.S. Pat. No. 8,098,677 describe example embodiments for network tool optimizer (NTO) devices that provide solutions for packet forwarding from network packet sources to network packet analysis tools and provide, in part, configuration of user-define filters, automatic creation of filter engine forwarding rules, automatic handling of filter overlaps, graphical user interfaces (GUIs) for filter creation, and other features. U.S. Pat. No. 8,018,943 and U.S. Pat. No. 8,098,677 are each hereby incorporated by reference in its entirety.

Network packet analysis tools include a wide variety of devices that analyze packet traffic, including traffic monitoring devices, packet sniffers, data recorders, voice-over-IP monitors, intrusion detection systems, network security systems, application monitors and/or any other network management or security tool device or system. Because it is difficult for network administrators to know what types of security threats the network will face and/or to know what types of user applications will need to be monitored within the network, entities having packet-based communication networks often purchase a wide variety of network tools to make sure all potential analysis and threat discovery needs are covered. Further, because the amount of network traffic that needs to be monitored is also difficult to predict, entities often purchase enough tool bandwidth capacity so that peak loads can be covered. However, when lower load conditions exists and/or when certain types of packet flows are not present, network tool capacity and processing capability goes unused thereby wasting resources.

Network analysis tools, such as traffic analyzers, are also used within packet-based data networks to determine details about the network packet traffic flows within the packet communication network infrastructure. For example, certain network traffic analyzers identify software applications being used and executed by devices operating within the packet communication network infrastructure, track user activity within the network infrastructure, identify possible security threats to the network in fractures and its network-connected devices, and/or make other determinations based upon an analysis of the network packet traffic and/or the contents of the data packets being communicated within the network infrastructure. Application and threat intelligence processors (ATIPs) are network traffic analyzers that are used to determinate applications operating within the network infrastructure and to identify potential threats to the network infrastructure. Network traffic analyzers, including application and threat intelligence processors (ATIPs), can be included as part of a network tool optimizer device or other tool aggregation device, and the resulting traffic analysis can be used to provide traffic information concerning the nature of network traffic to external devices and systems.

SUMMARY OF THE INVENTION

Network tool optimizer devices and related methods are disclosed that provide selective scanning of network packet traffic using cloud-based virtual machine tool platforms. Rather than require local network analysis tool resources, the disclosed embodiments identify subsets of traffic of interest (TOI) packets, and these subsets are forwarded to a cloud-based server system where cloud-based virtual machine tool platforms are used to process the subsets of traffic of interest. Results from this processing are then provided back to the network tool optimizer devices and can be used, for example, to adjust the operation of the network tool optimizer devices and/or for other purposes. In this way, network packet traffic is analyzed as needed by remote cloud-based tools rather than requiring local tool devices that may sit idle and unused if the packet analysis provided by these tools is not needed for current packet traffic. Certain further disclosed embodiments use local capture buffers and remote cloud replay buffers to stored subsets of traffic locally for later communication to cloud server systems where cloud-based tools are used to analyze replays of the captured network traffic. Additional disclosed embodiments use results from cloud-based tools to initiate local virtual machine tool platforms that are used to further analyze traffic of interest. Different features and variations can also be implemented, as desired, and related systems and methods can be utilized, as well.

For one embodiment, a method for processing network packets is disclosed that includes receiving one or more network packet streams at one or more input ports for a network tool optimizer (NTO) device, using the NTO device to analyze contents of packets within the one or more network packet streams to identify one or more subsets of traffic of interest (TOI) packets, forwarding the one or more subsets of TOI packets from the NTO device to a cloud server system having one or more cloud-based packet analysis tools, and receiving packet analysis results at the NTO device from the cloud server system, the packet analysis results being based upon packet processing conducted by the one or more cloud-based packet analysis tools. In further embodiments, the one or more network packet streams are received at a speed of 10 Gigabits per second or faster, and the communications with the cloud server system are performed at a speed of 50 Megabits per second or less.

In other embodiments, the method further includes generating packet forwarding rules associated with the one or more subsets of TOI packets, applying the packet forwarding rules to one or more filter engines within the NTO device, and using the one or more filter engines to forward the one or more subsets of TOI packets to the cloud server system. Further, the method can include sending the one or more subsets of TOI packets to a cloud offload processor within the NTO device and performing the forwarding a receiving steps using the cloud offload processor. In still further embodiments, the method also includes utilizing an application intelligence processor to identify one or more subsets of TOI packets relating to one or more applications associated with the one or more network packet streams. In additional embodiments, the method also includes utilizing a threat intelligence processor to identify one or more subsets of TOI packets relating to one or more network threats associated with the one or more network packet streams.

In further embodiments, the method also includes receiving the one or more subsets of TOI packets with a management platform within the cloud server system, sending the one or more subsets of TOI packets from the management platform to the one or more cloud-based packet analysis tools, receiving the packet analysis results with the management platform from the one or more cloud-based packet analysis tools, and sending the packet analysis results from the management platform to the NTO device. In additional embodiments, the management platform and the one or more cloud-based packet analysis tools include virtual machine platforms. In further embodiments, the method also includes analyzing contents of the one or more subsets of TOI packets with the management platform and selecting one or more cloud-based packet analysis tools to receive the one or more subsets of TOI packets based upon the contents.

In additional embodiments, the method also includes storing the one or more subsets of TOI packets within a capture buffer within the NTO device before forwarding the one or more subsets of TOI packets to the cloud server system. In addition, the method can further include storing the one or more subsets of TOI packets within a replay buffer within the cloud server system and forwarding the one or more subsets of TOI packets from the replay buffer to the one or more cloud-based packet analysis tools.

In still further embodiments, the method also includes adjusting operation of the NTO device using the packet analysis results received from the cloud server system. In addition, the method can further include operating one or more virtual machine tool analysis platforms within the NTO device based upon the packet analysis results.

For another embodiment, a network tool optimizer (NTO) device is disclosed that includes one or more input ports configured to receive one or more network packet streams, a packet processor, and a cloud offload processor. The packet processor is configured to receive the one or more network packet streams from the one or more input ports, to identify one or more subsets of traffic of interest (TOI) packets based upon contents of network packets within the one or more network packets streams, and to output the one or more subsets of TOI packets. And the cloud offload processor is configured to receive the one or more subsets of TOI packets, to send the one or more subsets of TOI packets to a cloud server system including one or more cloud-based packet analysis tools, and to receive packet analysis results from the cloud server system, the packet analysis results being based upon packet processing conducted by the one or more cloud-based packet analysis tools. In further embodiments, the one or more network packet streams are received at a speed of 10 Gigabits per second or faster, and the communications with the cloud server system are performed at a speed of 50 Megabits per second or less.

In other embodiments, the NTO device also includes a filter processor coupled to the packet processor. The filter processor is configured to generate packet forwarding rules associated with the one or more subsets of TOI packets and to apply the packet forwarding rules to one or more filter engines within the NTO device. And the one or more filter engines are configured to use the packet forwarding rules to forward the one or more subsets of TOI packets to the cloud offload processor.

In further embodiments, the offload processor is further configured to communicate the one or more subsets of TOI packets to a management platform within the cloud server system configured and to receive the packet analysis results from the management platform. In still further embodiments, the packet processor includes at least one of an application intelligence processor configured to identify one or more subsets of TOI packets relating to one or more applications associated with the one or more network packet streams or a threat intelligence processor configured to identify one or more subsets of TOI packets relating to one or more network threats associated with the one or more network packet streams. In additional embodiments, the NTO device further includes a capture buffer configured to store the one or more subsets of TOI packets.

In still further embodiments, the packet processor is configured to adjust operation of the NTO device based upon the packet analysis results received from the cloud server system. In additional embodiments, the packet processor is further configured to form one or more virtual machine tool analysis platforms within the NTO device based upon the packet analysis results.

For a further embodiment, a packet processing system is disclosed that includes a network tool optimizer (NTO) device and a management platform within a cloud server system. The NTO device includes one or more input ports configured to receive one or more network packet streams, a packet processor, and a cloud offload processor. The packet processor is configured to receive the one or more network packet streams from the one or more input ports, to identify one or more subsets of traffic of interest (TOI) packets based upon contents of network packets within the one or more network packets streams, and to output the one or more subsets of TOI packets. The cloud offload processor is configured to receive the one or more subsets of TOI packets, to forward the one or more subsets of TOI packets to a cloud server system including one or more cloud-based packet analysis tools, and to receive packet analysis results from the cloud server system, the packet analysis results being based upon packet processing conducted by the one or more cloud-based packet analysis tools. And the management platform within the cloud server systems is configured to receive the one or more subsets of TOI packets from the cloud offload processor, to communicate with the one or more cloud-based packet analysis tools, to receive the packet analysis results from the one or more cloud-based packet analysis tools, and to communicate the result information to the cloud offload processor.

In further embodiments, the management platform and the one or more cloud-based packet analysis tools include virtual machine platforms. In still further embodiments, the management platform is further configured to select one or more cloud-based packet analysis tools based upon contents of the one or more subsets of TOI packets.

Different features and variations can be implemented, as desired, and related systems and methods can be utilized, as well.

DESCRIPTION OF THE DRAWINGS

It is noted that the appended drawings illustrate example embodiments and are, therefore, not to be considered as limiting the scope of the inventions, for the inventions may admit to other equally effective embodiments.

DETAILED DESCRIPTION OF THE INVENTION

Figure 1:
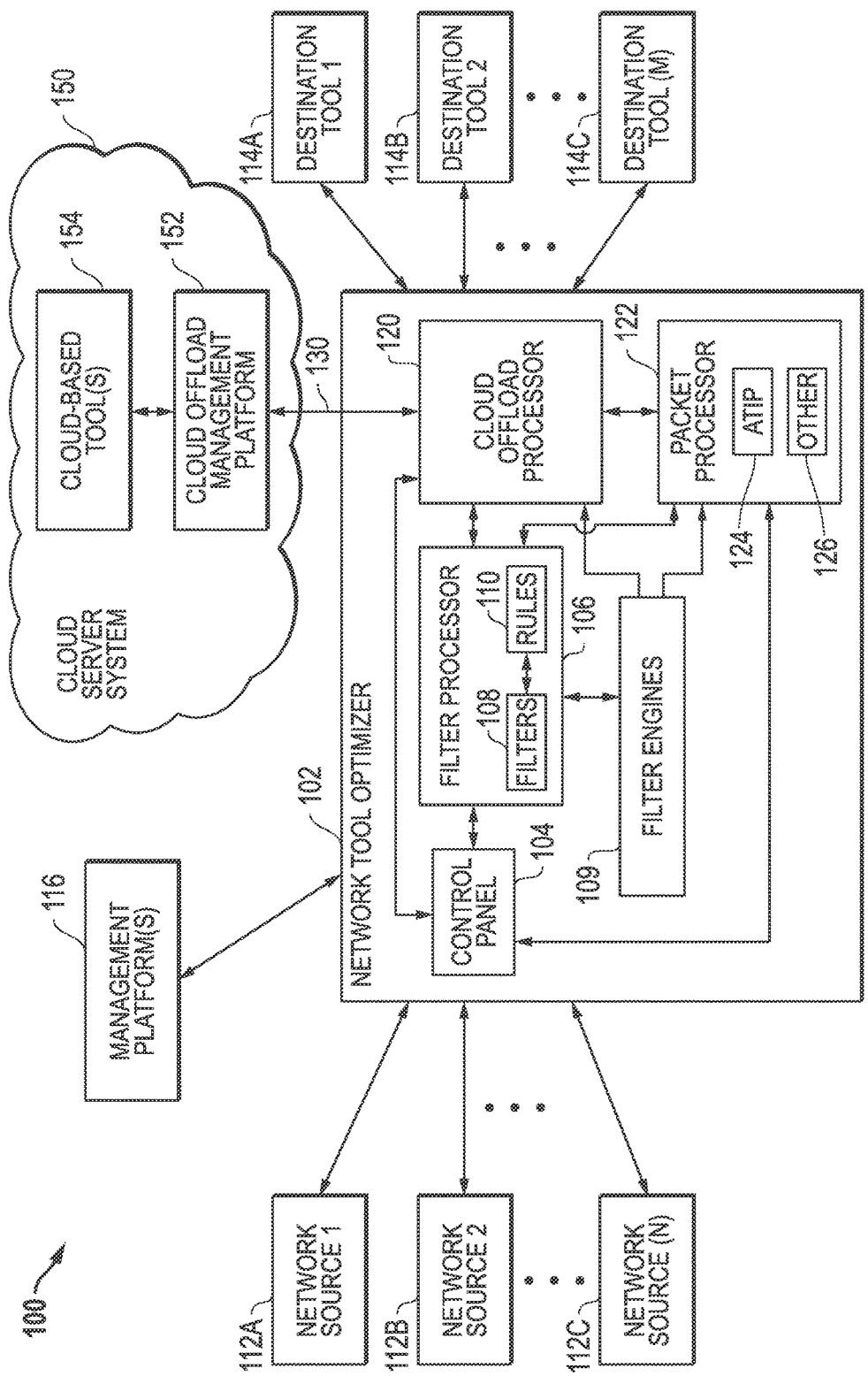
FIG. 1 is a block diagram of an example network monitoring system including a network tool optimizer (NTO) device having a cloud offload processor and a packet processor.

Network tool optimizer devices and related methods are disclosed that provide selective scanning of network packet traffic using virtual machine tool platforms. Rather than require local network analysis tool resources, the disclosed embodiments identify subsets of traffic of interest (TOI) packets, and these subsets are forwarded to a cloud-based server system where cloud-based virtual machine tool platforms are used to process the subsets of TOI packets. Results from this processing are then provided back to the network tool optimizer devices and can be used, for example, to adjust the operation of the network tool optimizer devices and/or for other purposes. In this way, network packet traffic is analyzed as needed by remote cloud-based tools rather than requiring local tool devices that may sit idle and unused if the packet analysis provided by these tools is not needed for current packet traffic. Certain further disclosed embodiments use local capture buffers and remote cloud replay buffers to stored subsets of traffic locally for later communication to cloud server systems where cloud-based tools are used to analyze replays of the captured network traffic. Additional disclosed embodiments use results from cloud-based tools to initiate local virtual machine tool platforms that are used to further analyze TOI packets. Different features and variations can also be implemented, as desired, and related systems and methods can be utilized, as well.

According to one aspect of the present invention, a network tool optimizer (NTO) device is a network packet forwarding device that includes one or more input ports configured to receive network traffic, such as network packets communicated through a packet-based communication network, and one or more output ports configured to output filtered network traffic. Network traffic can be received at the input ports for the NTO device from external or internal probes or taps within a communication network and/or other traffic sources. One or more network tool devices, such as traffic monitoring tools, can be connected to the output ports of the NTO device. As described further herein, the network packet analysis tools can also include cloud-based virtual machine (VM) tool platforms that are used to analyze subsets of packet traffic identified as traffic of interest (TOI) packets. In part, the embodiments described herein can also include a filter processor that automatically generates packet forwarding rules based upon one or more packet traffic filters that are defined within the NTO device. These packet forwarding rules determine at least in part how network traffic received by the NTO device on one or more input ports is forwarded by the NTO device to the cloud-based analysis tools and/or to one or more other output ports for the NTO device. The filter processor applies these packet forwarding rules to filter engines within the NTO device that in turn cause network traffic to be forwarded according to the packet forwarding rules.

As described herein, the disclosed embodiments are configured to analyze high bandwidth network traffic locally and then to send selected subsets of this network traffic through lower bandwidth connections, such as a wide area network (WAN) connection, to a cloud offload management platform within a cloud server system. This cloud offload management platform then analyzes the subset of network traffic and uses one or more cloud-based tools to further scan this traffic. Results produced by these cloud-based tools are then sent back to the NTO device through the lower bandwidth connection. For the embodiments described herein, it is assumed that local network traffic is being received by the NTO device through high bandwidth connections such as connections that provide communication speeds of 1 Gigabits per second (Gbps) or above and preferably that provide communication speeds of 10 Gbps to 40 Gbps or more. In contrast, WAN connections to cloud server system resources, such as may be available through the Internet, are typically operating at communication speeds of 50 Megabits per second (Mbps) or less. As such, there is often a 100-to-1 difference or more between network speeds for local LAN (local area network) connections to the NTO device and WAN connection speeds between the NTO device and a cloud server system. As recognized by the disclosed embodiments, therefore, only one or more subsets of identified TOI packets are forwarded to the cloud server system for scanning and/or other analysis by cloud-based packet analysis tools.

For certain embodiments, therefore, the NTO device receives and analyzes high-bandwidth packet stream(s) from one or more network sources and identifies a subset of packets that represent potential traffic of interest (TOI) to be analyzed using cloud-based virtual machine (VM) tool platforms. For example, this subset of TOI packets can represent packets for which more in-depth analysis is desired to help determine whether certain applications, threats, and/or other activities are present within the packet-based network communication system. This subset of TOI packets are then communicated through a WAN connection (e.g., as the original packets or as copies of the original packets), for example, using a tunnel, encapsulation, and/or other packet communication technique. A cloud-based offload management platform receives the subset of TOI packets from the NTO device and manages the formation and use of cloud-based VM tool platforms to further analyze the subset of packets. For example, the cloud-based offload management platform can determine which portions of the subset of TOI packets to forward to one or more cloud-based VM tool platforms. The cloud-based offload management platform receives results from the VM tool platforms and sends those results back through the WAN connection to the NTO device with or without additional analysis of the results by the cloud-based offload management platform. Other variations can also be implemented.

In part, the disclosed embodiments reduce unused tool capacity by taking advantage of the cloud-based virtual environment. For one example cloud-based virtual environment, resources within a server cloud are offered by a controlling entity (e.g., Amazon Web Services) to other entities that lease, rent, or otherwise pay for server cloud resources from the controlling entity. Taking advantage of such virtual cloud-based resources, the NTO embodiments described herein identify subsets of packet traffic that represents potential traffic of interest (TOI) and sends this subset of TOI packets to a cloud-based offload management platform hosted on a cloud servers system, and this offload management platform controls further analysis of the subsets of TOI packets by one or more cloud-based virtual machine tool platforms. Further, the VM tool platforms can be created and removed dynamically within the cloud-based virtual environment as needed to meet the bandwidth and tool-type requirements identified by the cloud-based offload management platform. By determining TOI subsets to send through the WAN connection to the cloud-based virtual environment, the embodiments described herein are able to better manage the limited bandwidth that is typically available with respect to WAN connections as opposed to local area network (LAN) connections. As further described below, certain additional embodiments utilize local capture buffers and remote cloud replay buffers to capture and later replay packet traffic for analysis by cloud-based tools. Additional embodiments also utilize local VM tool platforms to perform additional packet analysis based upon results generated by the cloud-based analysis tools. Other variations can also be implemented while still taking advantage of the cloud-based virtual machine (VM) tool platforms described herein to enhance the operation of local NTO devices.

Figure 5:
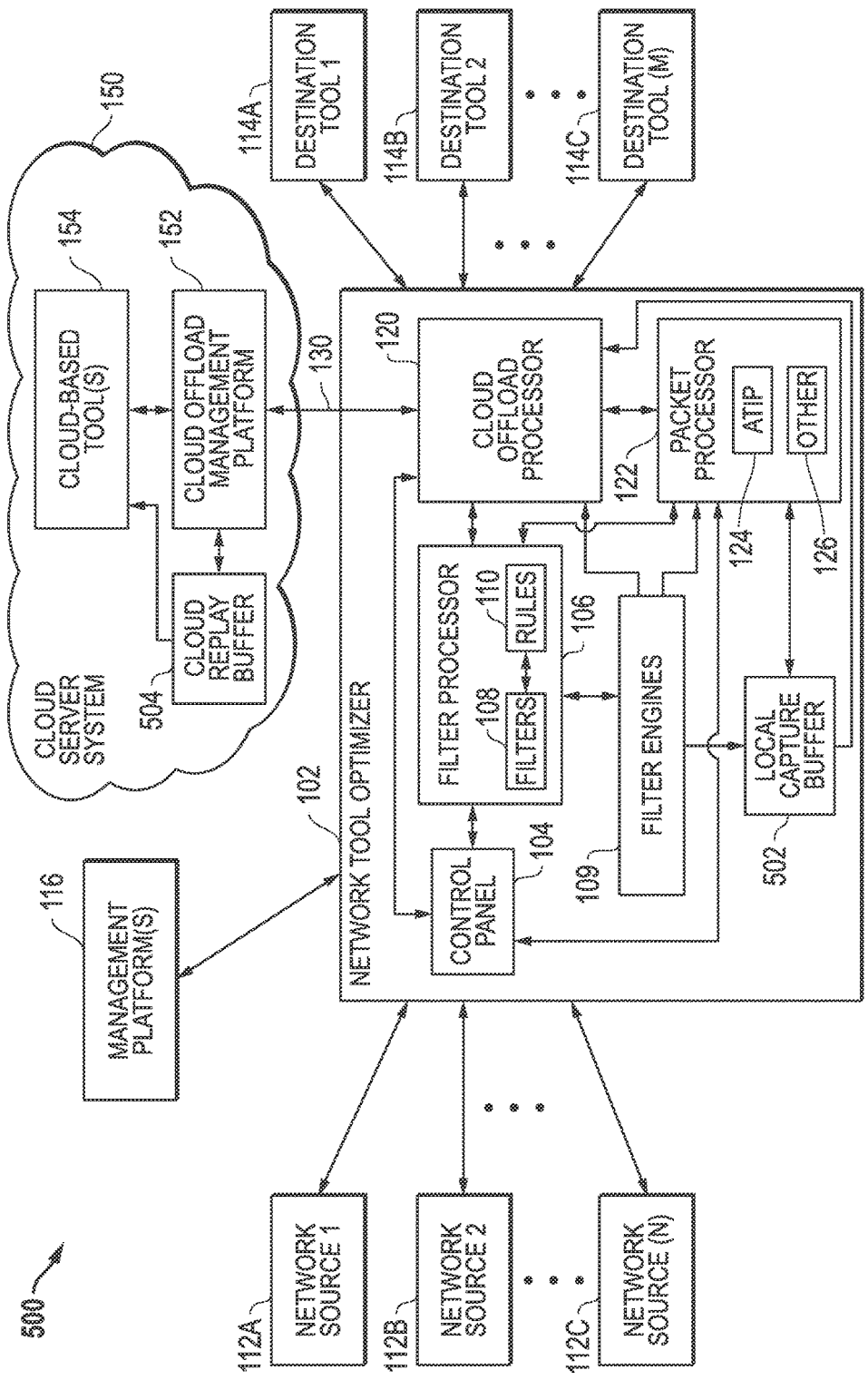
FIG. 5 is a block diagram of an example network monitoring system where a local capture buffer is used to store packet traffic of interest prior to its being forwarded to the cloud server system.
Figure 6:
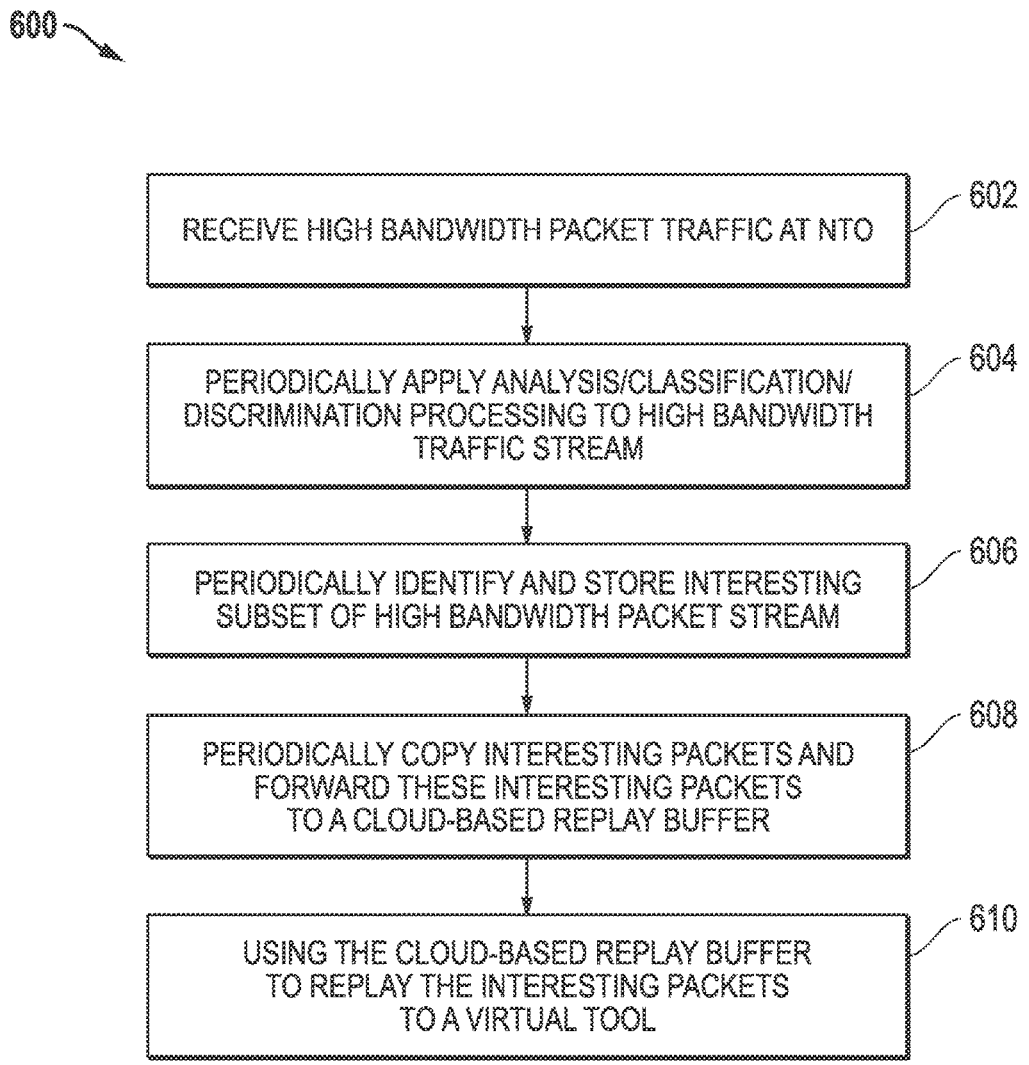
FIG. 6 is a process flow diagram of an example embodiment for identifying a subset of TOI packets to capture locally within a capture buffer and then forward to cloud-based replay buffer for further processing.
Figure 7:
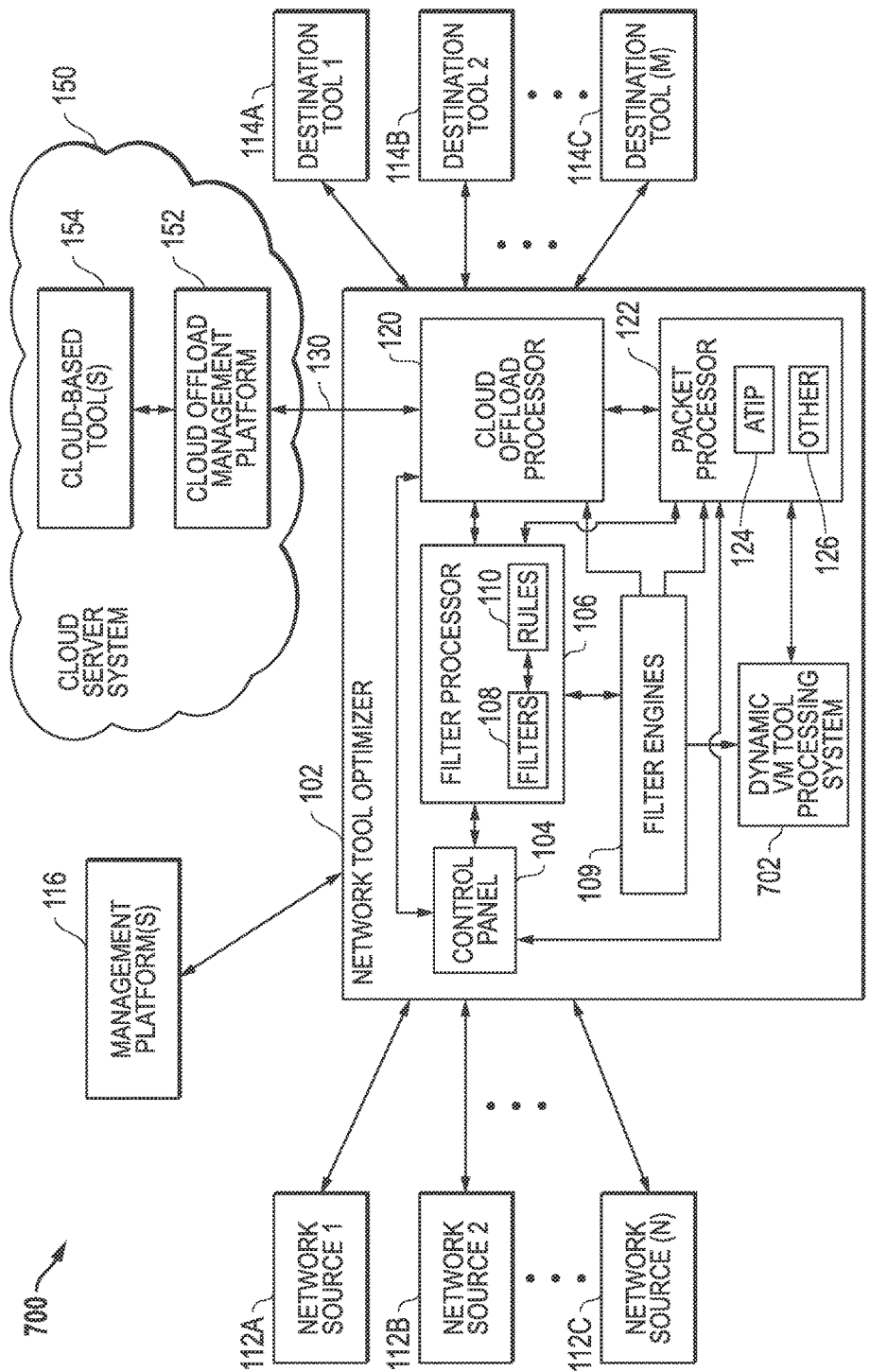
FIG. 7 is a block diagram of an example network monitoring system where a dynamic virtual machine (VM) tool processing system is used locally to process TOI packets based upon results of processing by cloud-based tools within the cloud server system.
Figure 8:
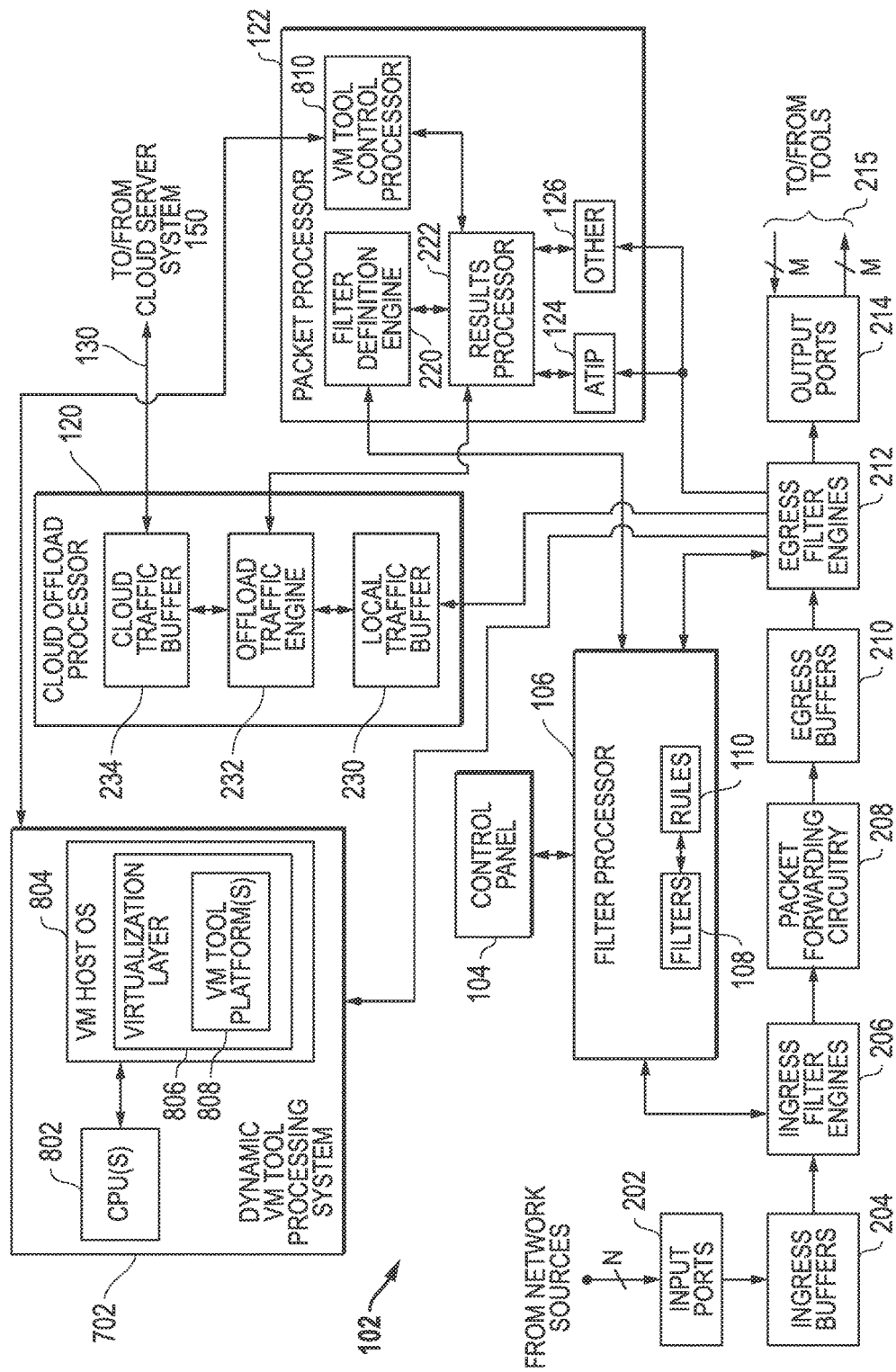
FIG. 8 is a block of an example embodiment for NTO device having a dynamic VM tool processing system.
Figure 9:
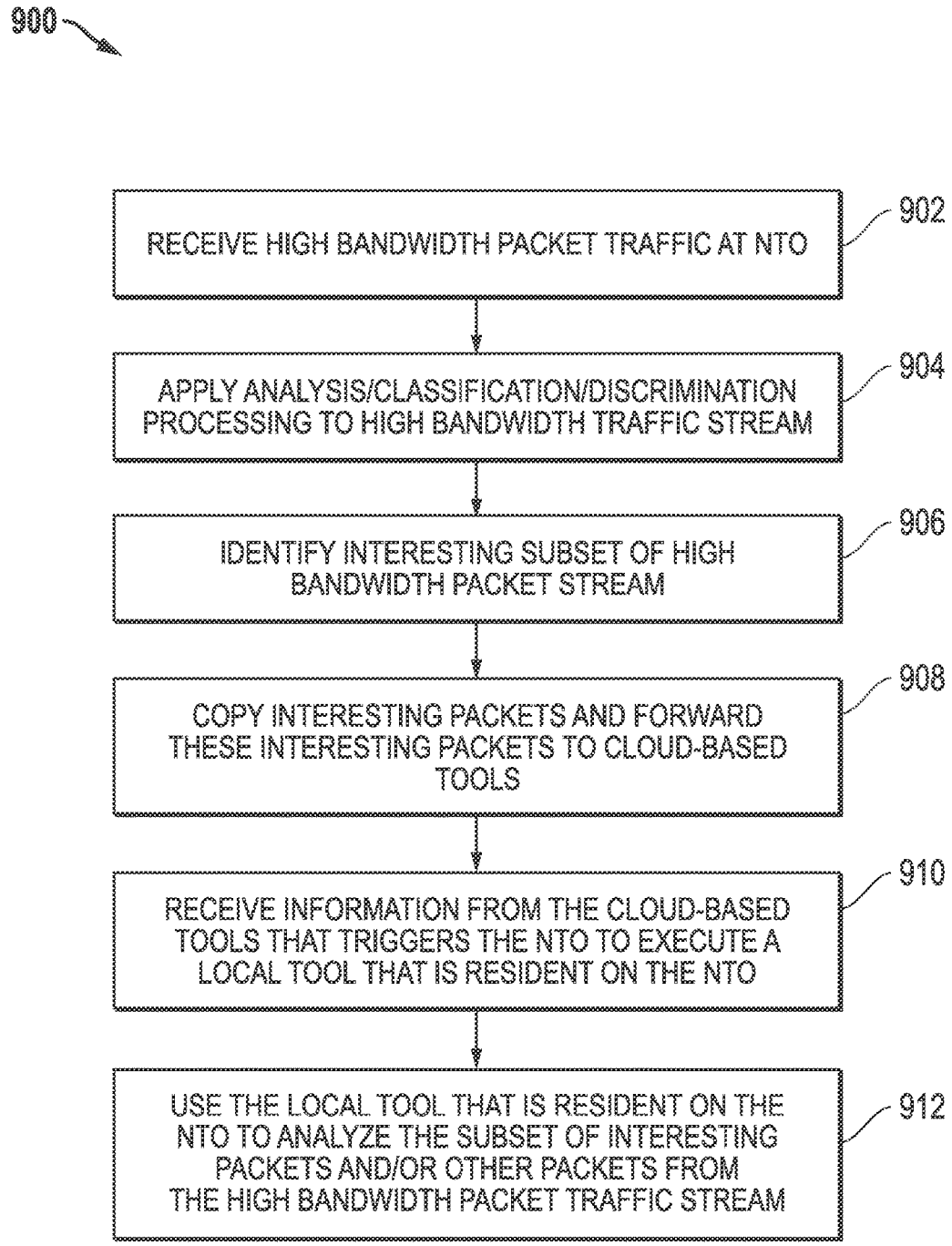
FIG. 9 is a process flow diagram of an example embodiment for identifying packet flows for further local processing using local VM tool platforms.

Example embodiments that provide selective scanning of network packets using cloud-based virtual machine tool platforms of discovery are now described further with respect to FIGS. 1, 2A-B, 3A-B, and 4. FIGS. 5-6 provide embodiments that also include local packet capture buffers and remote cloud replay buffers. And FIGS. 7-9 provide embodiments that include local dynamic VM tool processing systems.

FIG. 1 is a block diagram of an example network monitoring system 100 including a network tool optimizer (NTO) device 102 having a cloud offload processor 120 and a packet processor 122. As described in more detail below, the packet processor 122 receives network packets from one or network sources network sources 112A (SOURCE 1), 112B (SOURCE 2) . . . 112C (SOURCE (N)) and analyzes contents of the network packets to determine a selected subset of this network traffic as traffic of interest (TOI) to be scanned by one or more cloud-based analysis tools 154. In part, the packet processor 122 can utilize an application and threat intelligence processor (ATIP) 124 and/or other analysis engines 126 to analyze the contents of the network packets. The packet processor 122 communicates with the filter processor 106 to define packet filters 108 that are configured to forward the selected subset of TOI packet traffic to the cloud offload processor 120. As described herein, forwarding rules 110 associated with these filters 108 are generated and applied to the filter engines 109 by the filter processor 106. In operation, the filter engines 109 cause the selected subset of network TOI packets to be forwarded to the cloud offload processor 120. The cloud offload processor 120 then communicates this selected subset of network TOI packets to the cloud server system 150 through a communication channel 130, such as a wide area network (WAN) connection. A cloud offload management platform 152 within the cloud server system 150 receives the selected subset of network TOI packets and manages the formation and use of one or more cloud-based tools 154 to scan and/or otherwise analyze the network packets associated with this selected subset of network TOI packets. The results of this cloud-based offload processing is then provided back to the cloud offload processor 120, which can in turn provide these results to the packet processor 122 and/or through other interfaces to other systems that communicate with the NTO device 102. Further, these results can be used to modify existing packet filters within filters 108 and/or define additional packet filters for filters 108. Other variations could also be implemented.

Advantageously, this local packet analysis and selective cloud-based offload scanning allows the NTO device 102 to receive the results of remote cloud-based packet analysis tools 154 without requiring those tools to be connected locally to the NTO device 102. Although the discussion below focuses on the use of a single NTO device 102, it is noted that multiple different NTO devices 102 could be used, as desired, within a network environment. For example, a corporate network could employ a number of different NTO devices 102 that take advantage of the selective cloud-based offload scanning described herein. As such, the corporate network could obtain results from cloud-based scanning without requiring physical local tool devices to be connected to the NTO devices 102. As such, the number of local tool devices purchased and installed within the corporate network could be greatly reduced and/or eliminated while still using a WAN connection that has relatively low bandwidth. Further, as described herein, local tool devices can also be implemented a virtual machine platforms so that local tool resources can also be dynamically managed based upon processing needs.

Looking back to FIG. 1, it is seen that the network monitoring system 100 includes an NTO device 102 connected to network traffic sources, network tool devices, and management platforms. In particular, a plurality of network sources 112A (SOURCE 1), 112B (SOURCE 2) . . . 112C (SOURCE (N)) provide network traffic to the NTO device 102, such as network packets within a packet-based network communication system. This network traffic can be monitored and/or analyzed by one or more network analysis tools 114A (TOOL 1), 114B (TOOL 2) . . . 114C (TOOL (M)), if connected to the NTO device 102. The NTO device 102 in part includes filter processor 106 that operates to control how packets are forwarded from the network sources 114 to the packet processor 122, to the cloud offload processor 120, and/or to the destination tools 114 based upon packet forwarding rules 110 applied to filter engines 109. The NTO device 102 also allows users to view, define and/or manage filters 108 through one or more management platforms 116, and the NTO device 102 automatically generates packet forwarding rules 110 based upon the filters 108. Once generated, these packet forwarding rules 110 are applied by the filter processor 106 to filter engines 109. The filter engines 109 are then used to determine how packets are forwarded by the NTO device 102 from the network sources 112A, 112B . . . 112C to the destination tools 114A, 114B . . . 114C, if connected. Further, the filter engines 109 also determine how packets are forwarded to the packet processor 122 and/or to the cloud offload processor 120 based upon filters defined within filters 108 that select one or more subsets of network TOI packets to be analyzed by the cloud-based analysis tools 154.

The control panel module 104 for the NTO device 102 allows one or more management platform(s) 116 to connect to the NTO device 102 and to manage its operation. For example, using one or more of the management platform(s) 116, users can view, create and/or manage the filters 108 that in part determine how packets are forwarded by the NTO device 102. In addition, the management platform(s) 116 can be used by users to access, view, configure, and/or control the packet processor 122, the cloud offload processor 120, and/or other functional blocks for the NTO device 102. Further, the control panel module 104 can in part provide user interfaces (UIs) such as graphical user interfaces (GUIs) that allow the management platform(s) 116 to view, create and/or manage the filters 108.

It is noted that the network traffic, such as network packets, received from sources 112A, 112B . . . 112C can be obtained from network flows within a network infrastructure for the network monitoring system 100 through one of a variety of techniques and devices. These techniques and devices can include, for example, receiving traffic from network TAPs (test access ports), from SPAN (switched port analyzer) ports on network switches, and/or from other devices or systems that copy packets or packet contents from network traffic flows and make them available for other devices and systems. It is also noted that the connections and network communications described herein can include wired, wireless, and/or combinations of wired and wireless network communications among network-connected devices or systems and can include communications through one or more intervening devices or systems, such as firewalls, routers, switches, and/or other network-connected devices or systems. It is further noted that the control panel 104 for the NTO device 102 can be implemented as a web interface that can be accessed through a network browser (e.g., MICROSOFT Internet Explorer or MOZILLA Firefox) by other network-connected processing systems. For example, the NTO device 102 can be configured to automatically download a control panel software application to the management platform(s) 116 when a network browser operating on a management platform connects to an IP (internet protocol) address for the NTO device 102. This download can occur, for example, the first time the network browser connects, and the control panel 104 can then be stored locally by the management platform. The management platform(s) 116 can be, for example, personal computer systems, server systems, and/or other processing systems running WINDOWS operating systems, LINUX operating systems, and/or other operating system as desired. In one embodiment, the control panel 104 can in part be downloaded as JAVA-based software code or modules. Other implementations could also be implemented.

It is further noted that the network monitoring system 100 can include any of a wide variety of systems that are connected within a network environment. These systems can include server systems, data storage systems, desktop computer systems, portable computer systems, network switches, broadband routers and/or any other desired processing system that is connected into a communication network, as desired. The network connections can also be wired connections, wireless connections, or a combination of wired and wireless connections. In addition to these systems, any number of network monitoring tools 114A, 114B . . . 114C can also be connected to the NTO device 102, to the communication network, and/or to systems within the network. Further, the network monitoring tool(s) 114 can be any of a wide variety of network packet analysis tools including traffic monitoring devices, packet sniffers, data recorders, voice-over-IP monitors, intrusion detection systems, network security systems, application monitors and/or any other desired network management, network security, and/or network analysis device or system. Still further, as described herein, the network monitoring tool(s) 114 can also be implemented as virtual instances of tool appliances within a larger computing platform, such as a blade server systems. It is further noted that the network communications can be based upon any desired protocol or combination of protocols including Ethernet protocols, multi-protocol label switching (MPLS) protocols, FibreChannel (FC) protocols and/or any other desired communication protocol that can be used for network communications including packet-based network communications.

In addition, it is noted that the filters 108 as well as the forwarding engine rules 110 generated by the filter processor 106 can rely upon various portions of the content of network packets for forwarding actions. For example, network packets typically include in part a link layer header (L2), a network layer header (L3), a transport layer header (L4), and a payload, as well as other network layers (e.g., layers within the Open Systems Interconnect (OSI) model for network communications). Information pertinent to forwarding the packet, such as source ID (identifier) and destination ID and protocol type, is usually found in the packet headers. These packets may also have various other fields and information within them, such as fields including error check information, virtual local area network (VLAN) addresses, and/or other information that may be matched and used for filtering. Further, information representing the source device may include items such as the IP address of the source device or the MAC (Media Access Control) address of the source device. Similarly, information representing the destination tool device and/or output port may be included within the packet such as the IP address of the destination device. It is seen, therefore, that a wide variety of source and destination identifying information may be included within the data packets, as well as other packet related information along with the data included within the payload of the packet. While the embodiments described herein are primarily described with respect to packet-based communications and utilizing the information within these packets to forward the packets, the embodiments can be configured to operate with respect to other types of communication protocols and are not limited to packet-based networks.

Figure 2A:
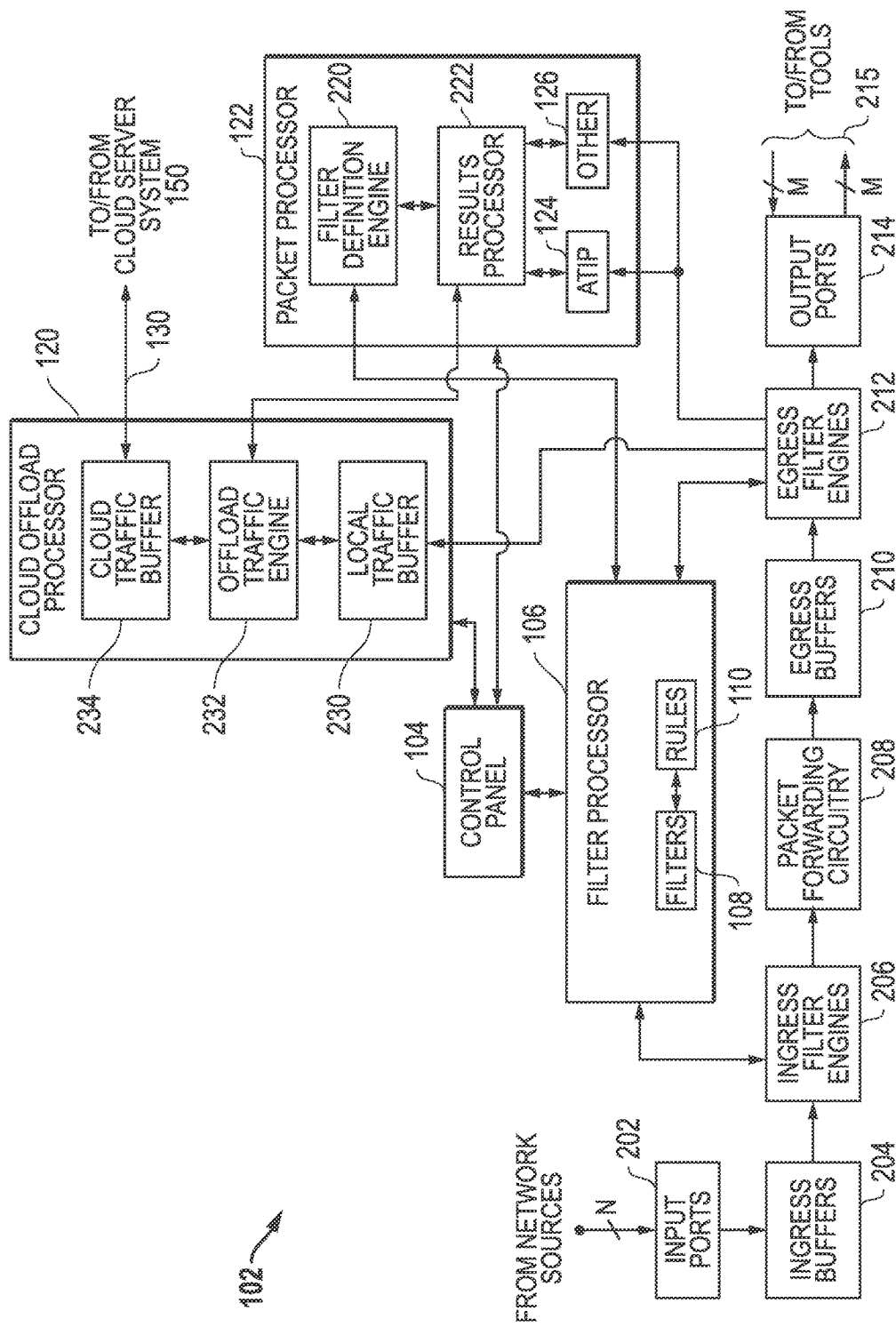
FIG. 2A is a block diagram for an example embodiment for an NTO device.

FIG. 2A is a block diagram for an example embodiment for NTO device 102. As described with respect to FIG. 1, the NTO device 102 includes a packet processor 122 and a cloud offload processor 120. The packet processor 122 further includes filter engine 220 and results processor 222 in addition to ATIP 124 and/or other packet analysis engines 126. The cloud offload processor 120 further includes a local traffic buffer 230, an offload traffic engine 232, and a cloud traffic buffer 234. As described above, the control panel module 104 provides user interface(s) for management access to the NTO device 102 through which filters 108 can be viewed, created, and/or modified. Further, the packet processor 122 generates and/or suggest one or more filters 108 based upon its packet analysis. Based upon the filters 108, the NTO device 102 generates forwarding rules 110 for filter engines 109, such as ingress filter engines 206 and egress filter engines 212, and then applies these forwarding rules 108 to the filter engines 206/212. In part, the results processor 222 within the packet processor 122 analyzes results generated by the ATIP 124 and/or other packet analysis engines 126 and communicates with the filter definition engine 220. The filter definition engine 220 in turn communicates with the filter processor 106 to define filters 108 and/or suggest filters 108 that will forward one or more selected subsets of traffic of interest (TOI) packets within the traffic received by the NTO device 102 to the cloud offload processor 120 for further scanning within the cloud server system 150. As described above, the filter processor 106 automatically generates packet forwarding rules 110 based upon the filters 108, and these packet forwarding rules 110 are applied to the filter engines 206/212 to determine in part how packets are forwarded by the packet forwarding circuitry 208 from input ports 202 to the packet processor 122, to the cloud offload processor 120, and/or to the output ports 214.

In operation, the packet forwarding circuitry 208 forwards packets based in part upon the forwarding rules 108 set up in the ingress filter engines 206 and the egress filter engines 212. For the embodiment depicted, packets from N network sources are received at the input ports 202. These packets are then stored in ingress queues or buffers 204 prior to being processed by ingress filter engines 206. Based upon ingress filter rules applied to the ingress filter engines 206, the packet forwarding circuitry 208 forwards packets to the cloud offload processor 120, to the packet processor 122, and/or to one or more output ports 214 through packet forwarding circuitry 208. However, prior to being output, the outgoing packets are first stored in egress queues or buffers 210 and then processed by egress filter engines 212. Based upon egress filter rules applied to the egress filter engines 212, the egress filter engines 212 forward the appropriate packets to the cloud offload processor 120, the packet processor 122, and/or to one or more output ports 214. The output ports 214 can be connected to one or more network analysis tools through M connections 215, if desired, and these connections 215 can be bi-directional connections. It is noted that the embodiments described herein could also be used without any network analysis tools connected to the output ports 214. The filter processor 106 communicates with the ingress filter engines 206 and egress filter engines 212 to apply the forwarding rules 108 so that these filter engines 206/212 will provide the packet forwarding defined by the filters 108 with respect to the network tool devices connected to the NTO device 102.

It is noted that the NTO device 102 can be implemented using one or more network packet switch integrated circuits (ICs), such as are available from Broadcom Corporation. These switch integrated circuits include input port circuitry, ingress buffer circuitry, ingress filter engine circuitry, packet switch fabric circuitry, egress buffer circuitry, egress filter engine circuitry, output port circuitry, internal processors, and/or other desired circuitry. Further these switch integrated circuits can include control and management interfaces through which they can be programmed to provide desired forwarding and control. As such, the filter processor 106 can program the filter engines within the network packet switch integrated circuit with appropriate forwarding rules. The NTO device 102 can also include other circuitry and components, as desired. For example, the NTO device 102 can include one or more printed circuit boards (PCBs) upon which the network packet switch IC(s) are mounted, power supply circuitry, signal lines coupled to external connections, external connectors (e.g., Ethernet connectors, fiber optic connectors, or other connectors), and/or other circuitry or components, as desired. It is further noted that the NTO device 102 including the filter processor 106 and the tool processor 120 can be implemented using one or more processing devices running software code or instructions. For example, the NTO device 102 can include one or more processing devices such as a microprocessor, a central processing unit (CPU), a microcontroller, a configurable logic device (e.g., CPLD (complex programmable logic device), FPGA (field programmable gate array)), and/or other processing device that is programmed to implement or control desired functionality. It is further noted that software and related processing device(s) used to implement the NTO device 102 and/or its components, such as filter processor 106, cloud offload processor 120, packet processor 122, and the control panel 104, can be implemented as software instructions embodied in a non-transitory computer-readable medium (e.g., memory storage devices, FLASH memory, DRAM memory, reprogrammable storage devices, hard drives, floppy disks, DVDs, CD-ROMs, etc.) including instructions that cause the processing devices used by the NTO device 102 to perform the processes, functions, and/or capabilities described herein.

In one embodiment for the NTO device 102, a PCB can include processing devices and memory separate from a network packet switch IC. The filter processor 106 can then be configured to operate on a separate processing device, and this separate processing device can interface with an application programming interface (API) provided by the network packet switch vendor for the network packet switch IC. This API provides an abstracted programmatic interface with which to apply filter rules to the filter engines within a network packet switch to control how packets are forwarded by the packet switch IC. The packet processor 122 and the cloud offload processor 120 can also be configured to operate on one or more separate processing devices, and these separate processing devices can also interface with the filter processor 106 and/or other circuitry within the NTO device 102. As further described herein, the NTO device 102 can also provide an externally available API to allow the network connected devices to communicate information, requests, commands, and/or other messages to and from the NTO device 102 through the API. Other variations can also be implemented, as desired.

As indicated above, the NTO device 102 can be configured to implement filters 108 as one or more forwarding rules 110 that are applied to filter engines 109, such as ingress filter engines 206 and egress filter engines 212. The forwarding rules 108 represent internal device specific representations that are used to implement the filter engine rules. For current packet switch ICs, these device specific representations often include programming or provisioning of filter rules into ternary content-addressable memories (TCAMs) within the packet switch ICs. A filter rule typically includes a predicate and one or more action(s). The predicate is one or more traffic-matching criteria that are logically AND-ed together (e.g., TCAM matching criteria such as VLAN ID or Source/Destination IP address). Each predicate compares a key to a value. The key is computed by selecting fields from packets based on protocol and content of the packet. An action can be defined by the filtering rule and applied when a match occurs. For current TCAMs and packet switch IC filter engines, actions typically include whether to pass the packet, whether to drop the packet, where to forward the packet, and/or other desired action(s) with respect to the packet. For example, additional actions can include adding headers, adding identifiers within headers, stripping headers, stripping identifiers within headers, and/or other additional actions to modify packet contents.

Based upon the applied filter rules 108, the filter engines 109, such as ingress filter engines 206 and egress filter engines 212, direct traffic from the input ports to the output ports and other internal ports within the NTO device 102. Filter rules 108 can specify a single traffic-matching criterion or they can involve Boolean expressions that logically combine various traffic-matching criteria to represent the desired filtering behavior. Further, the various criteria in the filter may include ranges and/or non-contiguous lists of values which effectively allow for a second level of OR-ing within the filters. In addition, other logic, such as NOT operations, and/or more complicated logic expressions such as source/destination pairs and bidirectional flows could also be represented in filter rules, if desired. A filter's traffic-matching criteria can be configured as desired. For example, matching criteria can be configured to include values in any ISO (International Standards Organization) OSI network layer 2 (L2) through layer 7 (L7) header value or packet content. It is noted that packet-based communications are often discussed in terms of seven communication layers under the OSI model: application layer (L7), presentation layer (L6), session layer (L5), transport layer (L4), network layer (L3), data link layer (L2), and physical layer (L1). Examples of traffic-matching filter criteria for packet-based communications include but are not limited to:

Layer 2 (L2): Source/Destination MAC address, VLAN, Ethertype

Layer 3 (L3): Source/Destination IP address, IP Protocol, Diffserv/TOS

Layer 4 (L4): Source/Destination L4 Port, TCP Control flags

It is noted that these L2-L4 criteria are useful because existing hardware designs for packet switch ICs parse these packet headers. However, packet switch devices can be improved by extending filter capabilities to layers 5-7 (L5-L7), and these additional filtering criteria can be used by the NTO device 102 as well. Other packet related information and layers could also be used, as desired.

Figure 2B:
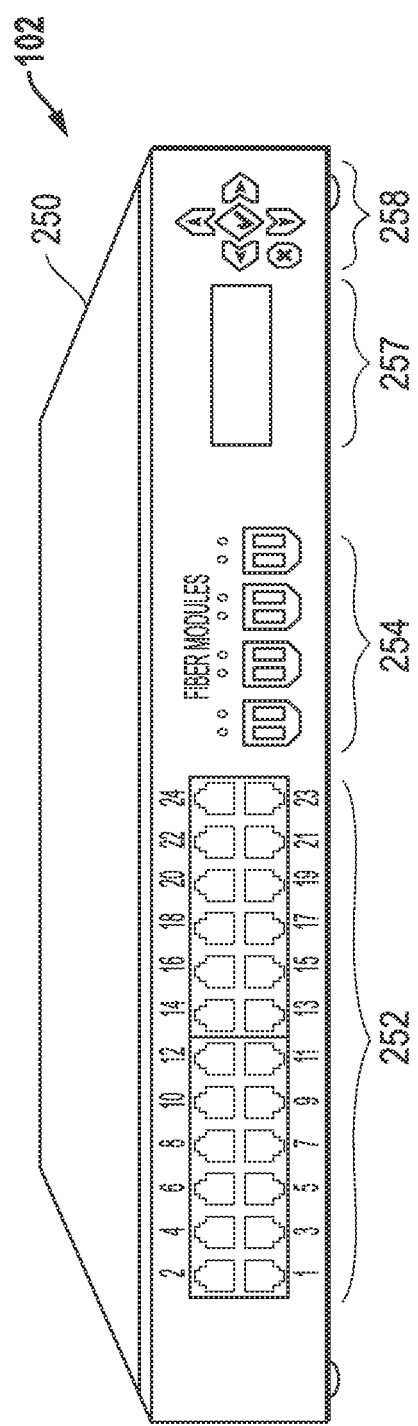
FIG. 2B is a diagram of an example embodiment for external connections for an NTO device.

FIG. 2B is a diagram of an example embodiment for external connections for an example NTO device 102. As depicted, the NTO device 102 includes a housing 250 having external connections for a variety of connector types. For example, Ethernet port connectors 252 can be provided (e.g., Ethernet ports 1-24), and fiber optic connectors 254 can be provided for fiber modules. Further, a display screen, such a back-lit LCD screen 257, can also be included for displaying information related to the NTO device 102. Direct navigation controls 258 can also be included, for example, for navigating management menus displayed in screen 257. Although not shown, a separate management network port can also be provided, for example, on the back of housing 250. This management network port can provide the control and management interface to control panel 104 for the NTO device 102. It is further noted that circuitry for the NTO device 102, including PCBs and power supply circuitry, can be mounted within the housing 250.

Figure 3A:
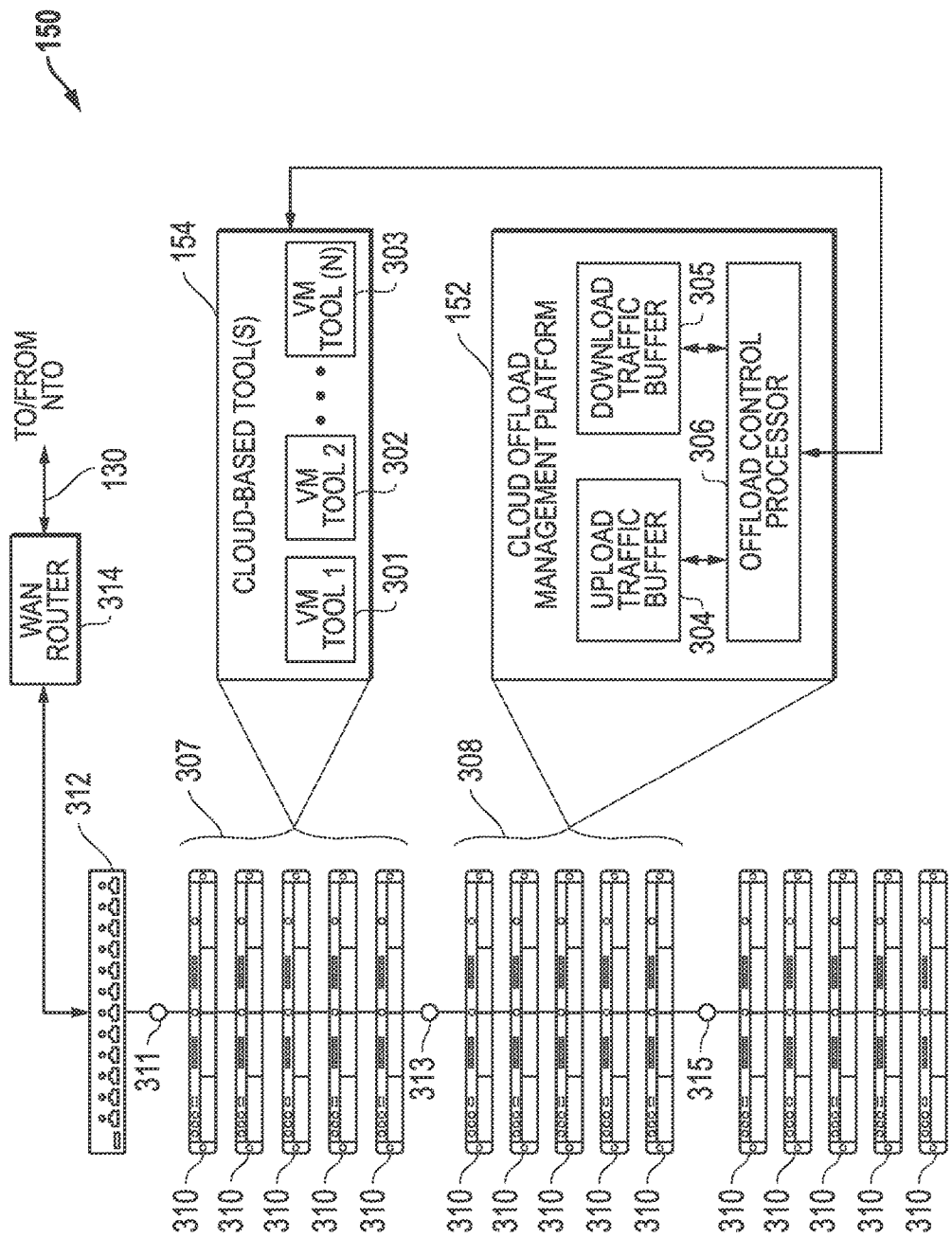
FIG. 3A is a system diagram of an example embodiment for a cloud server system including cloud-based tools and a cloud offload management platform that are running as virtual platforms.

FIG. 3A is a system diagram of an example embodiment for a cloud server system 150 including cloud-based tools 154 and cloud offload management platform 152 that are running as virtual platforms within the cloud server system 150. In the example embodiment depicted, a number of processing system platforms 310, such as blade servers, are connected within a packet-based communication network with each other through a local area network (LAN) switch 312. The LAN switch 312 is further connected to a WAN router 314, and the WAN router 314 communicates through WAN connection 130 to and from the NTO device 102. For the example embodiment 300, the processing system platforms 310 are configured into three groups as indicated by nodes 311, 313, and 315. The processing system platforms 310 within each group are managed together to provide virtual processing resources to external systems as part of the cloud based server 150. Further, the processing system platforms 310 within each group can be connected to each other by a high-speed communication backbone.

For the example embodiment depicted, one of these groups 307 is used to host the virtual cloud-based tools 154 as one or more virtual machine (VM) tool platforms 301, 302 . . . 303. For example, a first VM tool (VM TOOL 1) platform 301, a second VM tool (VM TOOL 2) platform 302 . . . to an Nth VM tool (VM TOOL N) platform 303 represent one or more virtual network packet analysis tools that provide similar and/or different types of packet analysis and that operate as VM platforms within the cloud server system 150. For example, certain VM tool platforms within the cloud-based tools 154 could be designed to monitor email traffic while others could be designed to monitor voice traffic, internet traffic, and/or other traffic types or combinations of traffic types. Further, these VM tool platforms can be dynamically created and deleted so that tool resources are made available and then removed based upon current tool processing needs.

For the example embodiment depicted, one of these groups 308 of processing system platforms 310 is used to host the virtual cloud offload management platform 152. This cloud offload management platform 152 further includes upload traffic buffer 304, download traffic buffer 305, and offload control processor 306. In operation, the subsets of TOI packets are first received by the upload traffic buffer 304 from the NTO device 102 through the WAN connection 130. The offload control processor 306 then analyzes the subsets of TOI packets and communicates with the cloud-based tools 154 to manage how these subsets of TOI packets are scanned and/or otherwise analyzed by the one or more VM tool platforms 301, 302 . . . 303 within the cloud-based tools 154. The results of this processing are then provided back to the cloud offload management platform 152 by the cloud-based tools 154. These packet analysis results are then stored by the offload control processor 306 within the download traffic buffer 305, and the results are then communicated from the download traffic buffer 305 to the NTO device 102 through the WAN connection 130. The packet analysis results can include a wide variety of data associated with the analysis of the TOI packet, such as for example, network security information, intrusion detection information, network activity information, and/or any other information generated by the cloud-based tools 154 that is desired to be forwarded back to the NTO device 102.

Figure 3B:
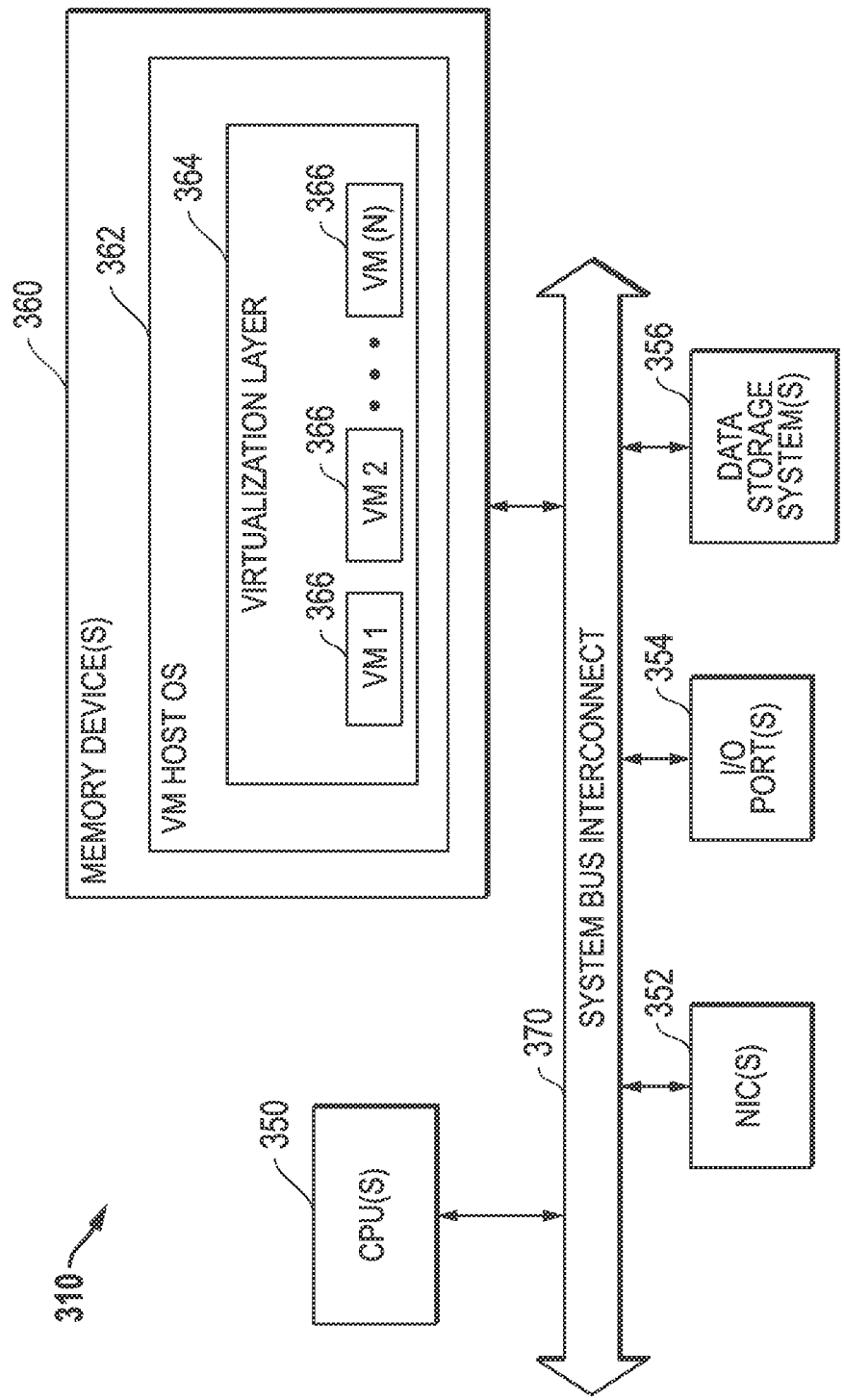
FIG. 3B is a block diagram of an example embodiment for a processing system platform.

FIG. 3B is a block diagram of an example embodiment for a processing system platform 310 such as a blade server. The processing system platform 310 includes one or more central processing units (CPUs) 305 or other suitable processors, one or more network interface cards (NICs) 352, one or more input/output (I/O) ports 354, one or more data storage systems 356, and one or more memory devices 360 coupled to communicate with each other through a system bus interconnect 370. In operation, virtualization layer 304 and one or more virtual machines (VM1, VM2 VM(N)) 366 are formed and run on top of a virtual machine (VM) host operating system (OS) 362 using memory devices 360. For example, the host VM operating system 362, the virtualization layer 364, and the one or more VM platforms 366 can be formed and operated by the CPUs 350 loading and executing software code and/or instructions stored in the data storage systems 356. As described above, the VM platforms 366 can perform any of a wide variety of functions including the functions described for the cloud-based analysis tools 154 and the cloud offload management platform 152 described herein. Further, as described below, the local dynamic VM tool processing system 702 of FIG. 7 can be implemented using a processing system platform 310 that is included within the NTO device 102, for example, as a blade server mounted within a chassis for the NTO device 102. Other processing device implementations could also be utilized, as desired, to provide virtual machine environments for the embodiments described herein.

Figure 4:
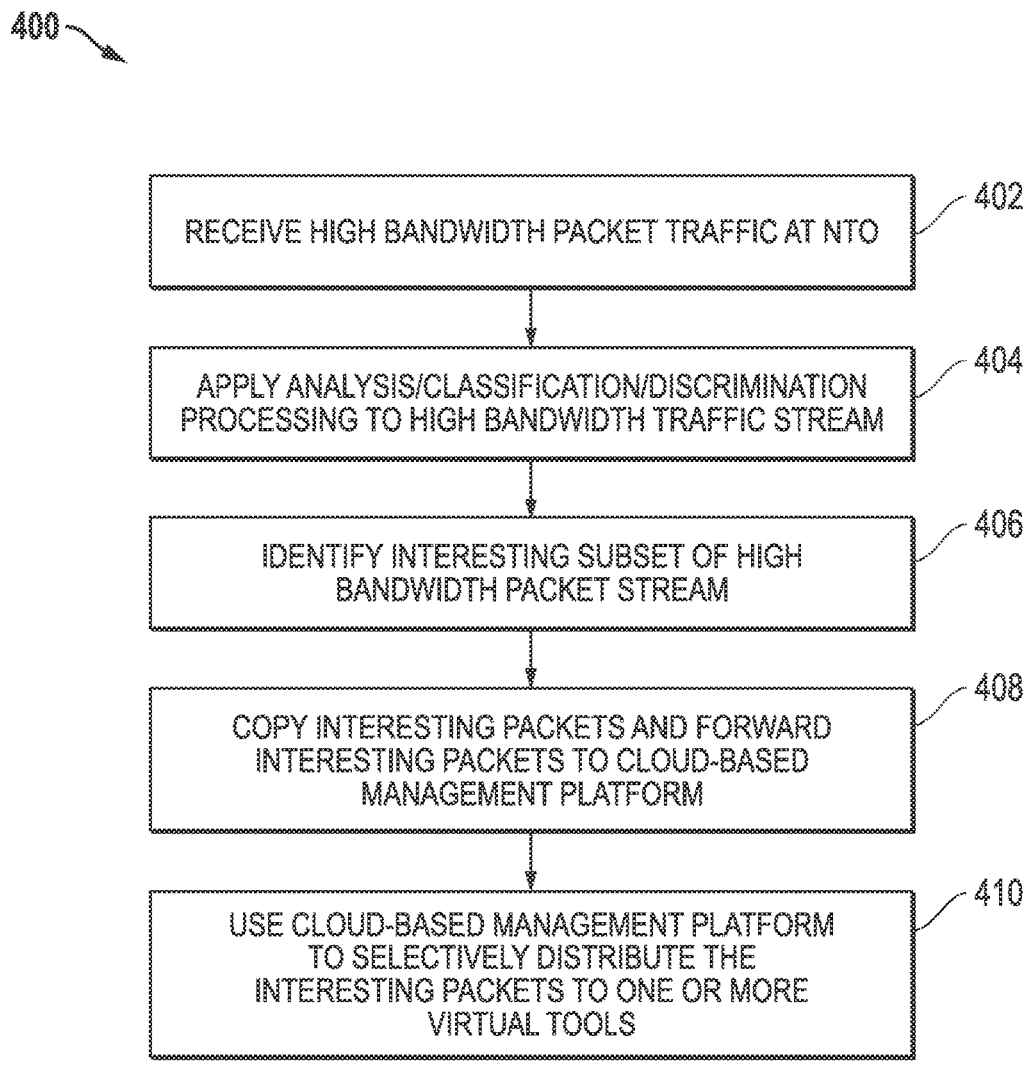
FIG. 4 is a process flow diagram of an example embodiment for identifying a subset of traffic of interest (TOI) packets to forward to cloud-based tools for further processing.

FIG. 4 is a process flow diagram of an example embodiment 400 for identifying a subset of traffic of interest (TOI) packets to forward to cloud-based tools 154 for further processing. In block 402, the NTO device 102 receives packet traffic, and this packet traffic can be at a relative high bandwidth such as at 10 Giga-bits per second (Gbps) or above. In block 404, packet processing is applied to the packet traffic stream, and this packet processing can include analysis of packet contents, classification of packet contents or packet types, discrimination of packets based upon selected parameters, and/or other desired packet processing. As described above, an ATIP (application threat and intelligence processor) engine 124 can be one type of packet processing engine applied to the packet traffic. In block 406, the results of the packet processing are used to identify a subset of TOI packets within the high bandwidth packet stream. In block 408, a copy of the subset of TOI packets are forwarded to the cloud-based management platform 152. In block 410, the cloud-based management platform 152 is used to selectively distribute the TOI packets to one or more virtual cloud-based tools 154 for further processing. As described herein, the results of this additional processing is forwarded back to the NTO device 102 where the results can be used to adjust the operation of the NTO device 102, can be output by the NTO device 102 to other external systems and/or interfaces, and/or can be used for other purposes.

It is noted that the ATIP engine 124 can include in part an application intelligence processor that analyzes network packet traffic to identify one or more subsets of TOI packets relating to one or more applications associated with the one or more network packet streams. Further, the ATIP 124 can include in part a threat intelligence processor that analyzes network packet traffic to identify one or more subsets of TOI packets relating to one or more network threats associated with the one or more network packet streams. The application intelligence processor and the threat intelligence processor can be used independently, if desired, although it is preferable for the ATIP 124 to provide both application and threat related analysis of network packet traffic.

With respect to block 408, it is further noted that the packet processor 122 communicates with the filter processor 106 to define one or more filters 108 that are configured to forward the TOI packets to the cloud offload processor 120. After these filters 108 are defined for one or more subsets of TOI packets, the filter processor 106 generates forwarding rules 110 associated with these filters 108. After generating the forwarding rules 110, the filter processor 106 applies these new rules to the filter engines 109 such a ingress filter engines 206 and egress filter engines 212 in FIG. 2A. In operation, the filter engines 109 then forward the one or more subsets of packet traffic of interest to the cloud offload processor 120 where those packets are then forwarded to the cloud server system 150 through the WAN communication channel 130. The priority of execution for the filter engine rules 110 can be set, for example, by placing high priority rules so that they are executed first within a given filter engine. In addition, priority of execution can be set by placing higher priority rules in ingress engines and lower priority rules in egress engines that receive packets according to the forwarding actions set forth in the ingress engines. For example, an ingress engine associated with an input port can forward all traffic from a particular source identifier to an egress engine, and the egress engine can drop any non-desired traffic before allowing desired traffic to be output to a particular internal port, such as an internal port coupled to the cloud offload processor 120, or to an external port for the NTO device 102.

The following tables represent example forwarding rules that can be set up in ingress and egress filter engines to handle an example subset of TOI packets where only email traffic (Port 25) is desired from a particular range of source identifiers to be provided to the cloud offload processor 120. The first table provides example ingress filter engine rules to forward all user traffic within the selected range of source port addresses (SP-Range) to an internal port associated with the cloud offload processor 120. User traffic outside the selected range is not sent to this internal port. The second table provides example egress filter engine rules that allow only email traffic (Port 25) to be passed to the cloud offload processor 120. All other packets are not sent to cloud offload processor 120. It is noted that for this example embodiment, it is assumed that an ingress filter engine is associated with an input port where the traffic is being received, and an egress engine is associated with the internal port associated with the cloud offload processor 120.

| EXAMPLE INGRESS/EGRESS FORWARDING RULES FOR OFFLOAD PROCESSOR | |
|---|---|
| Filter Value | Forwarding Action |
| Ingress Filter Engine at Input Port | |
| SP-Range | InternalOffloadPort |
| * | DROP |
| Egress Filter Engine at Internal Offload Port | |
| Port 25 | PASS |
| * | DROP |

For the tables above, it is assumed that the filter engine rules are processed in priority from top to bottom within the tables. As such, packets matching the criteria in higher priority rules will be forwarded according to those rules, and lower priority rules will not affect these packets as they will have already been forwarded according to a higher priority forwarding action. It is also noted that a "*" designation indicates that all values match the criteria, that a PASS designation indicates that packets matching the filter value are passed along, and that a DROP designation indicates that packets matching the filter values are discarded. It is further noted that the tables above represent a simplified example for the purpose of explaining the automatic filter and related filter rules generation and application. Actual implementations would likely provide more complex filter selections and associated rules to provide more sophisticated packet forwarding within the NTO device 102.

FIGS. 5-6 are now be considered. For some embodiments, it is desirable to store packets locally within the NTO device 102 prior to sending them to the cloud server system 150 for further processing by the cloud-based tools 154. FIGS. 5-6 provide example embodiments that utilize a local capture buffer 502 and a cloud replay buffer 504 to provide this local storage of packet traffic and remote replay/processing of this packet traffic. For these capture/replay embodiments, the NTO device 102 periodically analyzes and captures a portion of a packet streams received by the NTO device 102, for example, that have been determined to require more in-depth analysis by the cloud-based virtual tools 154. These packets of interest are stored locally within the local capture buffer 502, and then these packets of interest are later communicated to the cloud server system 150 for processing by the cloud-based tools 154 through the cloud offload management platform 152. As described above, the cloud offload management platform 152 can extract the packets from the communications made through the WAN channel 130, direct the packets to one or more cloud-based tools 154 for processing, and receive back results for this processing. These results can further be provided back to the NTO device 102 where they can be used to adjust or modify the operation of the NTO device 102 and/or for other purposes. For example, these results can be used to adjust the frequency of packet captures within the local capture buffer 502, to change the filters 108 and associated rules 110 that are used to forward packets to be captured from the received packet streams to the local capture buffer 502, to change the size of the packet captures, and/or to modify other operational behavior for the NTO device 102.

FIG. 5 is a block diagram of an example network monitoring system 500 where a local capture buffer 502 is used to store TOI packets prior to their being forwarded to the cloud server system 150. As described above, the packet processor 122 is again used to analyze packets and to identify a subset of TOI packets to provide to the cloud server system 150 for further processing by the cloud-based tools 154. For this embodiment, however, the identified TOI packets are first stored in the local capture buffer 502. At some later point in time, these TOI packets that were stored within the local capture buffer 502 are forwarded to the cloud offload management platform 152. The TOI packets are then stored in the cloud replay buffer 504. The management platform 152 then provides these TOI packets from the cloud replay buffer 504 to one or more cloud-based tool(s) 154 for further processing. The cloud replay buffer 504 effectively provides a replay of the packet traffic that was received at that NTO device 102 so that the cloud-based tools 154 can conduct packet analysis as if they were receiving live packet streams. The results of this processing are provided back from the cloud-based tools 154 to the cloud offload management platform 152, and these results can then be provided back from the cloud offload management platform 1523 to the cloud offload processor 120 for further use by the NTO device 102. The NTO device 102 can also provide result related information to users through the control panel 104 and/or output result related information to external systems. The results from the cloud-based tool processing can also be used for other purposes, as desired.

FIG. 6 is a process flow diagram of an example embodiment 600 for identifying a subset of TOI packets to capture locally within a capture buffer 502 and then forward to cloud-based replay buffer 504 for further processing. In block 602, packet traffic is received by the network tool optimizer (NTO) device, and this packet traffic can be at a relative high bandwidth such as at 10 Giga-bits per second (Gbps) or above. In block 604, packet processing is periodically applied to the packet traffic stream, and this packet processing can include analysis of packet contents, classification of packet contents or packet types, discrimination of packets based upon selected parameters, and/or other desired packet processing. As described above, an ATIP engine 124 is one type of packet processing that can be applied to the packet traffic. In block 606, the results of the packet processing are used to identify one or more subsets of TOI packets within the high bandwidth packet stream, and these subsets of TOI packets are periodically stored within the local capture buffer 502. In block 608, copies of the stored subsets of TOI packets are periodically forwarded to the cloud replay buffer 504 through the WAN connection 130 and the cloud-based management platform 152. In block 610, the cloud-based management platform 152 uses the cloud replay buffer 504 to replay the subsets of TOI packets to one or more virtual cloud-based tools 154 for further processing. As described herein, the results of this additional processing can be forwarded back to the NTO device 102 where the results can be further used within the NTO and/or provided to other external systems or interfaces.

With respect to block 608, it is further noted that the packet processor 122 communicates with the filter processor 106 to define one or more filters 108 that are configured to forward the TOI packets to the local capture buffer 502. After these filters 108 are defined for one or more subsets of TOI packets, the filter processor 106 generates forwarding rules 110 associated with these filters 108. After generating the forwarding rules 110, the filter processor 106 applies these new rules to the filter engines 109 such a ingress filter engines 206 and egress filter engines 212 in FIG. 2A. In operation, the filter engines 109 then forward the one or more subsets of packet traffic of interest to the local capture buffer 502 where those packets are stored for later processing in the cloud server system 150. The priority of execution for the filter engine rules 110 can also be set, for example, by placing high priority rules so that they are executed first within a given filter engine. In addition, priority of execution can be set by placing higher priority rules in ingress engines and lower priority rules in egress engines that receive packets according to the forwarding actions set forth in the ingress engines. For example, an ingress engine associated with an input port can forward all traffic from a particular source identifier to an egress engine associated with the internal port, and the egress engine can drop any non-desired traffic before allowing desired traffic to be output to the internal port.

The following tables represent example forwarding rules that can be set up in ingress and egress filter engines to handle an example subset of TOI packets where only email traffic (Port 25) is desired from a particular range of source identifiers to be stored in the local capture buffer 502. The first table provides example ingress filter engine rules to forward all user traffic within the selected range of source port addresses (SP-Range) to an internal port associated with the local capture buffer 502. User traffic outside the selected range is not sent to this internal port. The second table provides example egress filter engine rules that allows only email traffic (Port 25) to be passed to the local capture buffer 502. All other packets are not sent to the local capture buffer 502. It is noted that for this example embodiment, it is assumed that an ingress filter engine is associated with an input port where the traffic is being received, and an egress engine is associated with the internal port associated with local capture buffer 502.

| EXAMPLE INGRESS/EGRESS FORWARDING RULES FOR LOCAL CAPTURE BUFFER | |
| --- | --- |
| Filter Value | Forwarding Action |
| Ingress Filter Engine at Input Port | |
| SP-Range | CaptureBufferPort |
| * | DROP |
| Egress Filter Engine at Local Capture Buffer | |
| Port 25 | PASS |
| * | DROP |

For the tables above, it is assumed that the filter engine rules are processed in priority from top to bottom within the tables. As such, packets matching the criteria in higher priority rules will be forwarded according to those rules, and lower priority rules will not affect these packets as they will have already been forwarded according to a higher priority forwarding action. It is also noted that a "*" designation indicates that all values match the criteria, that a PASS designation indicates that packets matching the filter value are passed along, and that a DROP designation indicates that packets matching the filter values are discarded. It is further noted that the tables above represent a simplified example for the purpose of explaining the automatic filter and related filter rules generation and application. Actual implementations would likely provide more complex filter selections and associated rules to provide more sophisticated packet forwarding within the NTO device 102.

FIGS. 7-9 will now be considered. For some embodiments, it is desirable to have packets selected and processed by local VM tool platforms that are dynamically formed and executed to provide dynamic tool processing within the NTO device 102. FIGS. 7-9 provide example embodiments that utilize a dynamic VM tool processing system 702 within the NTO device 102 in order to provide this local VM tool processing for selected packet traffic of interest received by the NTO device 102. For these local VM tool processing embodiments, the NTO device 102 analyzes packet traffic and identifies potentially interesting subset(s) of packets that require more in-depth analysis by the cloud-based tools 154. As described above, the cloud offload management platform 152 can extract packets from the communications made through the WAN channel 130, direct the packets to one or more cloud-based tools 154 for processing, and receive back results for this processing. These results are then provided back to the NTO device 102 where they are used as feedback to cause the NTO device 102 to form and execute one or more local VM tool platforms 808 within the dynamic VM tool processing system 702 for subsequent analysis of the TOI packets being received by the NTO device 102. For example, subsequent analysis of packets being received by the NTO device 102 may be desired to be conducted at a bandwidth that is difficult to achieve through the WAN communication channel 130 and that can be achieved locally using one or more local VM tool platforms 808 as described herein.

FIG. 7 is a block diagram of an example network monitoring system 700 where a dynamic virtual machine (VM) tool processing system 702 is used locally to process packet traffic of interest based upon results of processing by cloud-based tools 154 within the cloud server system 150. The packet processor 122 is again used, as described above, to analyze packets and to identify a subset of TOI packets to provide to the cloud server system 150 for further processing by the cloud-based tools 154. For this embodiment, however, results from the processing by the cloud-based tools 154 are used to identify additional local tool processing. Once this additional local tool processing is identified, local VM tool platforms are formed within the dynamic VM tool processing system 702 to address this additional local tool processing, and these local VM tool platforms are then used to process additional packet traffic entering the NTO device 102. It is further noted that once the processing by the local VM tool platforms has completed, these local VM tool platforms can be deleted or removed. As such, local tool resources can be dynamically formed, used, and removed as needed.

FIG. 8 is a block of an example embodiment for NTO device 102 having a dynamic VM tool processing system 702. As with FIG. 2A above, the cloud offload processor 120 includes a cloud traffic buffer 234, an offload traffic engine 232, and a local traffic buffer 230. Further as above, the packet processor 122 includes rules engine 220, results processor 222 as well as ATIP engine 124 and/or other packet analysis engines 126. In contrast with FIG. 2A, embodiment 700 also includes a VM tool control processor 810 that is used to manage the formation, use, and removal of one or more virtual processing tools within the dynamic VM tool processing system 702. For the example embodiment depicted, the dynamic VM tool processing system 702 includes one or more central processing units (CPUs) operating software code or instructions to provide one or more VM tool platforms 808 within a virtualization layer 806 operating within a VM host operating system (OS) 804.

In operation, the VM tool control processor 810 communicates with the dynamic VM tool processing system 702 to form and utilize one or more VM tool platforms 808 as needed to process packet traffic of interest received by the NTO device 102. These additional TOI packets can be packets identified through the cloud server system 150 as packets for which further local tool processing is desired. For example, if results from the cloud-based tools 154 indicate that additional processing is needed for selected packets or packet flows, the results processor 222 communicates with the VM tool control processor 810 to indicate the types of packets or packet flows for which further processing is needed. The VM tool control processor 810 then communicates with the dynamic VM tool processing system 702 for form and use one or more VM tool platforms 808 to provide this additional tool processing. Further, filters 108 are defined within the filter processor 106 and related rules 110 are generated so that the identified packets or packet flows are provided to the dynamic VM tool processing system 702. The VM tool platforms 808 within the VM tool processing system 702 are then used to provide the additional processing. Results of this additional local processing can then be fed back to the VM tool control processor 810 and to the results processor 222 for further packet analysis determinations. In addition, once the processing by the VM tool platforms 808 has completed, the VM tool control processor 810 can delete or remove the VM tool platforms 808 that are no longer needed. As such, local tool processing resources can be dynamically controlled based upon processing needs.

FIG. 9 is a process flow diagram of an example embodiment 900 for identifying packet flows for further local processing using local VM tool platforms 808. In block 902, packet traffic is received by the NTO device 102, and this packet traffic can be at a relative high bandwidth such as at 10 Giga-bits per second (Gbps) or above. In block 904, packet processing is applied to the packet traffic stream, and this packet processing can include analysis of packet contents, classification of packet contents or packet types, discrimination of packets based upon selected parameters, and/or other desired packet processing. As described above, an ATIP engine 124 is one type of packet processing that can be applied to the packet traffic. In block 906, the results of the packet processing are used to identify one or more subsets of TOI packets within the high bandwidth packet stream. In block 908, copies of these subsets of TOI packets are forwarded to the cloud-based tools 154 through the cloud-based management platform 152. In block 910, result information received from the cloud-base tools 154 is used to trigger the NTO device 102 to form and execute one or more local VM tool platforms 808 that are resident within the dynamic VM tool processing system 702 for the NTO device 102. In block 912, the local VM tool platform 808 is used to analyze the subset of TOI packets. The results of this additional processing can then be further used within the NTO device 102 and/or provided to other external systems or interfaces.

With respect to block 908, it is further noted that the packet processor 122 communicates with the filter processor 106 to define one or more filters 108 that are configured to forward the TOI packets to the dynamic VM tool processing system 702. After these filters 108 are defined or one or more subsets of packet traffic of interest, the filter processor 106 generates forwarding rules 110 associated with these filters 108. After generating the forwarding rules 110, the filter processor 106 applies these new rules to the filter engines 109 such a ingress filter engines 206 and egress filter engines 212 in FIG. 2A. In operation, the filter engines 109 then forward the one or more subsets of additional packet traffic of interest to the local VM tool processing system 702 where those packets are processed using local VM tool platforms 808. The priority of execution for the filter engine rules 110 can also be set, for example, by placing high priority rules so that they are executed first within a given filter engine. In addition, priority of execution can be set by placing higher priority rules in ingress engines and lower priority rules in egress engines that receive packets according to the forwarding actions set forth in the ingress engines. For example, an ingress engine associated with an input port can forward all traffic from a particular source identifier to an egress engine associated with the internal port, and the egress engine can drop any non-desired traffic before allowing desired traffic to be output to the internal port.

The following tables represent example forwarding rules that can be set up in ingress and egress filter engines to handle an example subset of traffic of interest where only email traffic (Port 25) is desired from a particular range of source identifiers to be processing by the local VM tool platforms 808. The first table provides example ingress filter engine rules to forward all user traffic within the selected range of source port addresses (SP-Range) to an internal port associated with dynamic VM tool processing system 702. User traffic outside the selected range is not sent to this internal port. The second table provides example egress filter engine rules that allows only email traffic (Port 25) to be passed to the dynamic VM tool processing system 702. All other packets are not sent to the VM tool processing system 702. It is noted that for this example embodiment, it is assumed that an ingress filter engine is associated with an input port where the traffic is being received, and an egress engine is associated with the internal port associated with VM tool processing system 702.

| EXAMPLE INGRESS/EGRESS FORWARDING RULES FOR LOCAL CAPTURE BUFFER ||
| --- | --- |
| Filter Value | Forwarding Action |
| Ingress Filter Engine at Input Port ||
| SP-Range | VMToolPort |
| * | DROP |
| Egress Filter Engine at VMToolPort ||
| Port 25 | PASS |
| * | DROP |

For the tables above, it is assumed that the filter engine rules are processed in priority from top to bottom within the tables. As such, packets matching the criteria in higher priority rules will be forwarded according to those rules, and lower priority rules will not affect these packets as they will have already been forwarded according to a higher priority forwarding action. It is also noted that a "*" designation indicates that all values match the criteria, that a PASS designation indicates that packets matching the filter value are passed along, and that a DROP designation indicates that packets matching the filter values are discarded. It is further noted that the tables above represent a simplified example for the purpose of explaining the automatic filter and related filter rules generation and application. Actual implementations would likely provide more complex filter selections and associated rules to provide more sophisticated packet forwarding within the NTO device 102.

It is also noted that the operational blocks described herein can be implemented using hardware, software or a combination of hardware and software, as desired. In addition, integrated circuits, discrete circuits or a combination of discrete and integrated circuits can be used, as desired, that are configured to perform the functionality described. Further, configurable logic devices can be used such as CPLDs (complex programmable logic devices), FPGAs (field programmable gate arrays), ASIC (application specific integrated circuit), and/or other configurable logic devices. In addition, one or more processors and/or other processing devices running software or firmware could also be used, as desired. For example, computer readable instructions embodied in a non-transitory tangible storage medium (e.g., memory storage devices, FLASH memory, random access memory, read only memory, programmable memory devices, reprogrammable storage devices, hard drives, floppy disks, DVDs, CD-ROMs, and/or any other tangible storage medium) could be utilized including instructions that cause computer systems, processors, programmable circuitry (e.g., FPGAs, CPLDs), and/or other processing devices to perform the processes, functions, and capabilities described herein. It is further understood, therefore, that one or more of the tasks, functions, or methodologies described herein may be implemented, for example, as software or firmware and/or other instructions embodied in one or more non-transitory tangible computer-readable mediums that are executed by a CPU (central processing unit), controller, microcontroller, processor, microprocessor, FPGA, CPLD, ASIC, or other suitable processing device or combination of such processing devices. It is further noted that the data storage systems described herein can be any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for processing network packets, comprising:
receiving one or more network packet streams at one or more input ports for a network tool optimizer (NTO) device;
using the NTO device to analyze contents of packets within the one or more network packet streams to identify one or more subsets of traffic of interest (TOI) packets;
forwarding the one or more subsets of TOI packets from the NTO device to a cloud server system having one or more cloud-based packet analysis tools;
receiving the one or more subsets of TOI packets with a management platform within the cloud server system;
sending the one or more subsets of TOI packets from the management platform to the one or more cloud-based packet analysis tools;
receiving the packet analysis results with the management platform from the one or more cloud-based packet analysis tools;
sending the packet analysis results from the management platform to the NTO device; and
receiving packet analysis results at the NTO device from the cloud server system, the packet analysis results being based upon packet processing conducted by the one or more cloud-based packet analysis tools.

2. The method of claim 1, further comprising generating packet forwarding rules associated with the one or more subsets of TOI packets, applying the packet forwarding rules to one or more filter engines within the NTO device, and using the one or more filter engines to forward the one or more subsets of TOI packets to the cloud server system.

3. The method of claim 2, wherein the one or more filter engines forward the one or more subsets of TOI packets to a cloud offload processor within the NTO device and the forwarding and receiving steps are performed using the cloud offload processor.

4. The method of claim 1, wherein the management platform and the one or more cloud-based packet analysis tools comprise virtual machine platforms.

5. The method of claim 1, further comprising analyzing contents of the one or more subsets of TOI packets with the management platform and selecting one or more cloud-based packet analysis tools to receive the one or more subsets of TOI packets based upon the contents.

6. The method of claim 1, further comprising utilizing an application intelligence processor to identify one or more subsets of TOI packets relating to one or more applications associated with the one or more network packet streams.

7. The method of claim 1, further comprising utilizing a threat intelligence processor to identify one or more subsets of TOI packets relating to one or more network threats associated with the one or more network packet streams.

8. The method of claim 1, further comprising storing the one or more subsets of TOI packets within a capture buffer within the NTO device before forwarding the one or more subsets of TOI packets to the cloud server system.

9. The method of claim 8, further comprising storing the one or more subsets of TOI packets within a replay buffer within the cloud server system and forwarding the one or more subsets of TOI packets from the replay buffer to the one or more cloud-based packet analysis tools.

10. The method of claim 1, adjusting operation of the NTO device using the packet analysis results received from the cloud server system.

11. The method of claim 10, further comprising operating one or more virtual machine tool analysis platforms within the NTO device based upon the packet analysis results.

12. The method of claim 1, wherein the one or more network packet streams are received at a speed of 10 Gigabits per second or faster, and wherein the forwarding and receiving steps are performed at a speed of 50 Megabits per second or less.

13. A network tool optimizer (NTO) device, comprising:
one or more input ports configured to receive one or more network packet streams;
a packet processor configured to receive the one or more network packet streams from the one or more input ports, to identify one or more subsets of traffic of interest (TOI) packets based upon contents of network packets within the one or more network packets streams, and to output the one or more subsets of TOI packets; and
a cloud offload processor configured to receive the one or more subsets of TOI packets, to forward the one or more subsets of TOI packets to a cloud server system including one or more cloud-based packet analysis tools, and to receive packet analysis results from the cloud server system, the packet analysis results being based upon packet processing conducted by the one or more cloud-based packet analysis tools;
wherein the offload processor is further configured to communicate the one or more subsets of TOI packets to a management platform within the cloud server system which is configured to send the one or more subsets of TOI packets from the management platform to the one or more cloud-based packet analysis tools and to receive the packet analysis results from the one or more cloud-based packet analysis tools, and the offload processor is further configured to receive the packet analysis results from the management platform.

14. The NTO device of claim 13, further comprising a filter processor coupled to the packet processor, the filter processor being configured to generate packet forwarding rules associated with the one or more subsets of TOI packets and to apply the packet forwarding rules to one or more filter engines within the NTO device, the one or more filter engines being configured to use the packet forwarding rules to forward the one or more subsets of TOI packets to the cloud offload processor.

15. The NTO device of claim 13, wherein the packet processor comprises at least one of an application intelligence processor configured to identify one or more subsets of TOI packets relating to one or more applications associated with the one or more network packet streams or a threat intelligence processor configured to identify one or more subsets of TOI packets relating to one or more network threats associated with the one or more network packet streams.

16. The NTO device of claim 13, further comprising a capture buffer configured to store the one or more subsets of TOI packets.

17. The NTO device of claim 13, wherein the packet processor is configured to adjust operation of the NTO device based upon the packet analysis results received from the cloud server system.

18. The NTO device of claim 17, wherein the packet processor is further configured to form one or more virtual machine tool analysis platforms within the NTO device based upon the packet analysis results.

19. The NTO device of claim 13, wherein the one or more input ports are configured to receive the one or more network packet streams at a speed of 10 Gigabits per second or faster, and wherein the cloud offload processor is configured to communicate with the cloud server systems at a speed of 50 Megabits per second or less.

20. A packet processing system, comprising:
a network tool optimizer (NTO) device, comprising:
one or more input ports configured to receive one or more network packet streams;
a packet processor configured to receive the one or more network packet streams from the one or more input ports, to identify one or more subsets of traffic of interest (TOI) packets based upon contents of network packets within the one or more network packets streams, and to output the one or more subsets of TOI packets; and
a cloud offload processor configured to receive the one or more subsets of TOI packets, to forward the one or more subsets of TOI packets to a cloud server system including one or more cloud-based packet analysis tools, and to receive packet analysis results from the cloud server system, the packet analysis results being based upon packet processing conducted by the one or more cloud-based packet analysis tools; and
a management platform within the cloud server system, the management platform being configured to receive the one or more subsets of TOI packets from the cloud offload processor, to communicate the one or more subsets of TOI packets to the one or more cloud-based packet analysis tools, to receive the packet analysis results from the one or more cloud-based packet analysis tools, and to communicate the result information to the cloud offload processor.

21. The packet processing system of claim 20, wherein the management platform and the one or more cloud-based packet analysis tools comprise virtual machine platforms.

22. The packet processing system of claim 20, wherein the management platform is further configured to select one or more cloud-based packet analysis tools based upon contents of the one or more subsets of TOI packets.

* * * * *